US010439758B2

United States Patent
Park et al.

(10) Patent No.: US 10,439,758 B2
(45) Date of Patent: *Oct. 8, 2019

(54) RECEIVING APPARATUS AND DECODING METHOD THEREOF

(71) Applicant: SAMSUNG ELECTRONICS CO., LTD., Suwon-si (KR)

(72) Inventors: Jung-hyun Park, Hwaseong-si (KR); Jung-pil Yu, Seongnam-si (KR); Sung-kyu Jung, Seongnam-si (KR); Chang-hoon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,270

(22) Filed: Apr. 19, 2018

(65) Prior Publication Data

US 2018/0241599 A1 Aug. 23, 2018

Related U.S. Application Data

(63) Continuation of application No. 15/297,495, filed on Oct. 19, 2016, now Pat. No. 9,960,944.

(Continued)

(30) Foreign Application Priority Data

Oct. 17, 2016 (KR) .................. 10-2016-0134560

(51) Int. Cl.
*H04L 27/26* (2006.01)
*H04L 1/00* (2006.01)
(Continued)

(52) U.S. Cl.
CPC .............. *H04L 1/0057* (2013.01); *H04L 1/00* (2013.01); *H04L 1/007* (2013.01); *H04L 1/0041* (2013.01);
(Continued)

(58) Field of Classification Search
CPC ....... H04L 1/0045; H04L 1/00; H04L 1/0048; H04L 27/0488; H04L 27/38;
(Continued)

(56) References Cited

U.S. PATENT DOCUMENTS 6,574,235 B1 6/2003 Arslan et al.
7,418,060 B2 8/2008 Chen et al.
(Continued)

FOREIGN PATENT DOCUMENTS

| CA | 2940700 A1 | 9/2015 |
|----|------------|--------|
| KR | 10-1294023 B1 | 8/2013 |
| KR | 10-2015-0100569 A | 9/2015 |

OTHER PUBLICATIONS

International Search Report (PCT/ISA/210) dated Feb. 13, 2017 issued by the International Searching Authority in counterpart International Application No. PCT/KR2016/011743.

(Continued)

*Primary Examiner* — Sophia Vlahos
(74) *Attorney, Agent, or Firm* — Sughrue Mion, PLLC

(57) ABSTRACT

A receiving apparatus includes: a first decoder configured to decode a signal transmitted through a first layer from a layered division multiplexing (LDM) signal using a parity check matrix to generate low density parity check (LDPC) information word bits and parity bits; an encoder configured to encode the LDPC information word bits, generated by decoding the signal transmitted through the first layer, using the parity check matrix to generate parity bits corresponding only to preset columns in the parity check matrix; and a second decoder configured to decode a signal obtained by removing, from the LDM signal, a signal corresponding to the LDPC information word bits generated by decoding the signal transmitted through the first layer, the parity bits generated by the encoder, and the parity bits generated by the first decoder except the parity bits generated by the (Continued)

encoder, thereby to generate information word bits transmitted through a second layer.

14 Claims, 23 Drawing Sheets

Related U.S. Application Data

(60) Provisional application No. 62/243,246, filed on Oct. 19, 2015.

(51) Int. Cl.
*H04L 27/34* (2006.01)
*H04L 27/38* (2006.01)
*H04N 19/30* (2014.01)

(52) U.S. Cl.
CPC .......... *H04L 1/0045* (2013.01); *H04L 1/0048* (2013.01); *H04L 27/3488* (2013.01); *H04L 27/38* (2013.01); *H04L 27/3416* (2013.01); *H04N 19/30* (2014.11)

(58) Field of Classification Search
CPC ............. H04L 27/0047; H04L 27/2602; H04L 27/3488; H03M 13/1105; H03M 13/3776; H04N 19/30
See application file for complete search history.

(56) References Cited

U.S. PATENT DOCUMENTS

| | | | |
|---|---|---|---|
| 7,426,246 B2 | 9/2008 | Chen et al. | |
| 8,989,319 B2 | 3/2015 | Park et al. | |
| 9,537,512 B2 | 1/2017 | Lorca Hernando | |
| 9,960,944 B2* | 5/2018 | Park | H04L 27/2602 |
| 2006/0153315 A1* | 7/2006 | Chen | H04B 7/18515 |
| | | | 375/295 |
| 2007/0025283 A1* | 2/2007 | Koslov | H04B 7/18517 |
| | | | 370/316 |
| 2010/0218067 A1* | 8/2010 | Kim | H04L 1/0036 |
| | | | 714/752 |
| 2012/0230437 A1 | 9/2012 | Markman et al. | |
| 2014/0082452 A1* | 3/2014 | Shinohara | H03M 13/036 |
| | | | 714/758 |
| 2016/0277150 A1* | 9/2016 | Baek | H03M 13/2792 |

OTHER PUBLICATIONS

Jae Hyun Seo et al, "LLR Calculation Method for Receiving System of Layered Division Multiplexing", In: The Korea Institute of Communications and Information Science, 2015 Winter Conference, Jan. 23, 2015, pp. 1089-1090.
Jon Montalban et al, "Performance Study of Layered Division Multiplexing Based on SDR Platform", IEEE Transactions on Broadcasting, vol. 61, Issue: 3, Sep. 2015, total 10 pages.
Jon Montalban Sanchez, "Solutions for New Terrestrial Broadcasting Systems Offering Simultaneously Stationary and Mobile Services", Ph.D. Thesis, University of the Basque Country, Spain, Dec. 2014, total 240 pages.
Pablo Angueira et al, "Layered Division Multiplexing: A technique to make flexible use of the broadcast spectrum", In: Layered Division Multiplexing (LDM) Tutorial—UPV/EHU—DVB TM, Geneva, Oct. 2014, total 72 pages.
Rich Chernock, "ATSC 3.0 overview", Triveni Digital, Inc, Jun. 2015, total 37 pages.
Written Opinion (PCT/ISA/237) dated Feb. 13, 2017 issued by the International Searching Authority in counterpart International Application No. PCT/KR2016/011743.
Montalban et al. "Error propagation in the cancellation stage for a multi-layer signal reception", Aug. 11, 2014, Broadband Multimedia Systems and Broadcasting (BMSB), 2014 IEEE International Symposium on, pp. 1-5.
Park et al. Low Complexity Layered Division Multiplexing System for the Next Generation Terrestrial Broadcasting, Aug. 6, 2015, Broadband Multimedia Systems and Broadcasting (BMSB), 2015 IEEE International Symposium on, pp. 1-3.

\* cited by examiner

FIG. 8
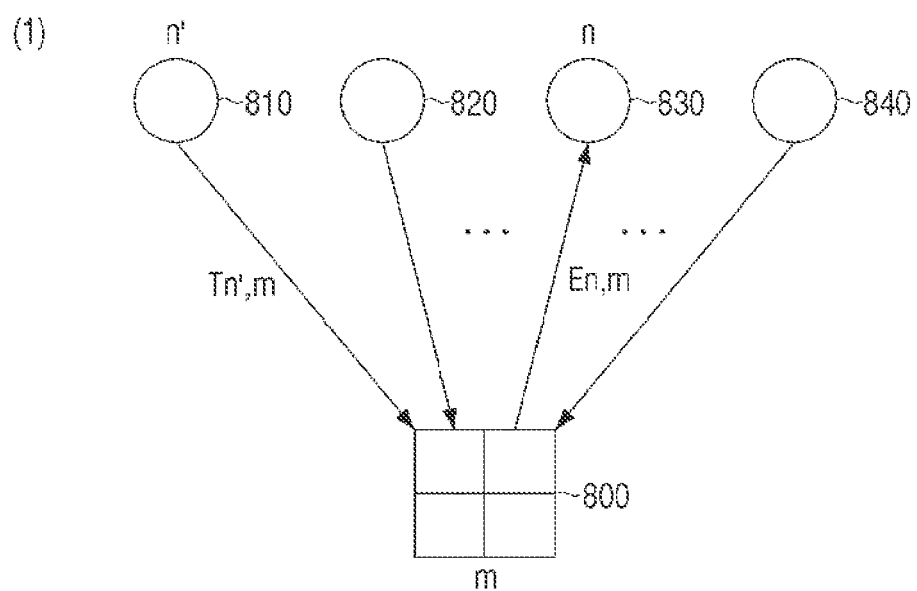
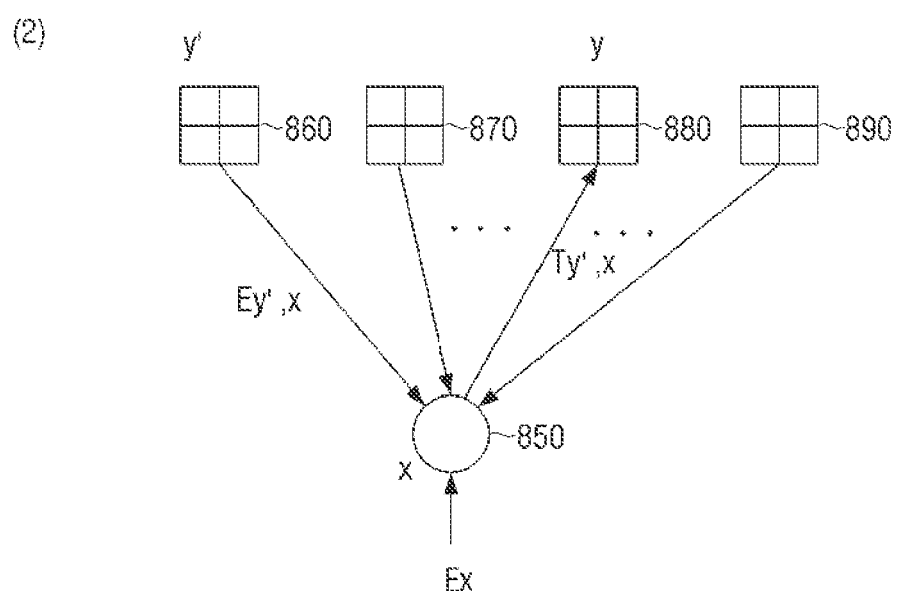

RECEIVING APPARATUS AND DECODING METHOD THEREOF

CROSS-REFERENCE TO THE RELATED APPLICATIONS

This is a continuation of U.S. application Ser. No. 15/297,495 filed Oct. 19, 2016, which claims priority from U.S. Provisional Application No. 62/243,246 filed on Oct. 19, 2015 and Korean Patent Application No. 10-2016-0134560 filed in the Korean Intellectual Property Office on Oct. 17, 2016, the disclosures of which are incorporated herein by reference in its entirety.

BACKGROUND

1. Field

Apparatuses and methods consistent with the exemplary embodiments relate to signal reception and decoding, and more particularly, to receiving and decoding a layered division multiplexing (LDM) signal.

2. Description of the Related Art

In the information society of the 21st century, a broadcasting communication service is welcoming the time of full-scale digitalization, multi-channelization, broadband, and high quality. In particular, as a supply of high-definition digital television (TV), personal medial player (PMP), and a portable broadcasting device is recently expanded, a demand for a support of various reception systems of a digital broadcasting service is also increased.

Meanwhile, since an environment required by a system is diverse such as in the case in which signal latency is important or performance is important, it is requested to find a method for processing an LDM signal in the diverse environment.

SUMMARY

Exemplary embodiments may or may not overcome the above disadvantages and other disadvantages not described above. Also, the exemplary embodiments are not required to overcome the disadvantages described above.

The exemplary embodiments provide a receiving apparatus capable of efficiently processing an LDM signal, and a decoding method thereof.

According to an exemplary embodiment, there is provided a receiving apparatus receiving and processing a layered division multiplexing (LDM) signal which may include: a first decoder configured to decode a signal transmitted through a first layer from the LDM signal using a parity check matrix to generate low density parity check (LDPC) information word bits and parity bits; an encoder configured to encode the LDPC information word bits, generated by decoding the signal transmitted through the first layer, using the parity check matrix to generate parity bits corresponding only to preset columns in the parity check matrix; and a second decoder configured to decode a signal obtained by removing, from the LDM signal, a signal corresponding to the LDPC information word bits generated by decoding the signal transmitted through the first layer, the parity bits generated by the encoder, and the parity bits generated by the first decoder except the parity bits generated by the encoder, thereby to generate information word bits transmitted through a second layer.

The preset columns may be columns having a degree of 1 in the parity check matrix.

The parity check matrix may include a first parity check matrix including a first information word partial matrix and a first parity partial matrix, which is a dual diagonal matrix, and a second parity check matrix including a second information word partial matrix and a second parity partial matrix, which is a unit matrix, and the encoder may generate the parity bits corresponding only to the columns having the degree of 1 in the parity check matrix.

The first decoder may decode the signal transmitted through the first layer from the LDM signal using a first LDPC decoder, and decode the LDPC information word bits, corresponding to the signal transmitted through the first layer, using a first Bose, Chaudhuri, Hocquenghem (BCH) decoder to generate information word bits transmitted through the first layer.

The encoder may encode the LDPC information word bits, corresponding to the signal transmitted through the first layer, using an LDPC encoder to generate the parity bits corresponding only to the preset columns in the parity check matrix.

The encoder may encode the information word bits, transmitted through the first layer, using a BCH encoder to generate the parity bits, and the LDPC encoder may encode the information word bits transmitted through the first layer and the BCH parity bits to generate the parity bits corresponding only to the preset columns in the parity check matrix.

The second decoder may decode the signal obtained by the removing to generate LDPC information word bits and parity bits, corresponding to a signal transmitted through the second layer, using the first LDPC decoder, and decode the LDPC information word bits, corresponding to the signal transmitted through the second layer, using the first BCH decoder to generate the information word bits transmitted through the second layer.

The second decoder may decode the signal obtained by the removing to generate the LDPC information word bits and parity bits, corresponding to a signal transmitted through the second layer, using a second LDPC decoder, and decode the LDPC information word bits, corresponding to the signal transmitted through the second layer, using a second BCH decoder to generate the information word bits transmitted through the second layer.

According to an exemplary embodiment, there is provided a decoding method of a receiving apparatus receiving and processing an LDM signal. The method may include: decoding a signal transmitted through a first layer from the LDM signal using a parity check matrix to generate LDPC information word bits and parity bits; encoding the LDPC information word bits, generated by decoding the signal transmitted through the first layer, using the parity check matrix to generate parity bits corresponding only to preset columns in the parity check matrix; and decoding a signal obtained by removing, from the LDM signal, a signal corresponding to the LDPC information word bits generated by decoding the signal transmitted through the first layer, the parity bits generated by the encoding, and the parity bits generated by the decoding except the parity bits generated by the encoding, thereby to generate information word bits transmitted through a second layer.

The preset columns may be columns having a degree of 1 in the parity check matrix.

The parity check matrix may include a first parity check matrix including a first information word partial matrix and a first parity partial matrix, which is a dual diagonal matrix, and a second parity check matrix including a second information word partial matrix and a second parity partial matrix, which is a unit matrix, and the preset columns may have the degree of 1 in the parity check matrix.

In the decoding the signal transmitted through the first layer from the LDM signal, the LDPC information word bits and the parity bits corresponding to the signal transmitted through the first layer may be generated using a first LDPC decoder, and the LDPC information word bits, corresponding to the signal transmitted through the first layer, may be decoded using a first Bose, Chaudhuri, Hocquenghem (BCH) decoder to generate information word bits transmitted through the first layer.

In the generating the parity bits corresponding only to the preset columns, the LDPC information word bits, corresponding to the signal transmitted through the first layer, may be encoded using an LDPC encoder to generate the parity bits corresponding only to the preset column in the parity check matrix.

In the generating the parity bits corresponding only to the preset columns, the information word bits, transmitted through the first layer, may be BCH encoded to generate BCH parity bits, and the information word bits transmitted through the first layer and the BCH parity bits may be encoded to generate the parity bits corresponding only to the preset columns in the parity check matrix.

The decoding the signal obtained by the removing may include: generating LDPC information word bits and parity bits, corresponding to a signal transmitted through the second layer, using the first LDPC decoder; and decoding the LDPC information word bits, corresponding to the signal transmitted through the second layer, using the first BCH decoder to generate the information word bits transmitted through the second layer.

The decoding the signal obtained by the removing may include: generating LDPC information word bits and parity bits, corresponding to a signal transmitted through the second layer, using a second LDPC decoder; and decoding the LDPC information word bits, corresponding to the signal transmitted through the second layer, using a second BCH decoder to generate the information word bits transmitted through the second layer.

According to the exemplary embodiments, the LDM signal may be efficiently processed.

BRIEF DESCRIPTION OF THE DRAWING FIGURES

The above and/or other aspects will be more apparent by describing certain exemplary embodiments with reference to the accompanying drawings, in which:

FIGS. 7 and 8 are diagrams illustrating an LDPC decoding;

DETAILED DESCRIPTION OF THE EXEMPLARY EMBODIMENTS

Hereinafter, the present disclosure will be described in more detail with reference to the accompanying drawings.

When a receiving apparatus according to an exemplary embodiment processes a signal generated according to an LDM system, it may first decode a core layer (or an upper layer) signal, inversely restore or generate the decoded core layer signal, and remove the inversely-restored or inversely-generated core layer signal from the LDM signal, thereby making it possible to restore or generated an enhanced layer (or a lower layer). Hereinafter, the word "restore" may be interchangeably used with the word "generate."

A receiving apparatus according to an exemplary embodiment may receive and process a signal (hereinafter, referred to as a layered division multiplexing (LDM) signal) generated by a superposition coded modulation (SCM) according to the LDM, to thereby restore bits transmitted through each layer.

Here, the SCM means a coding method in which each of the signals including the same data or different data is superimposed or overlapped to have different power from each other. In this case, a signal having a relatively large power in the LDM signals configures an upper layer (UL) (or core layer), and a signal relatively small power configures a lower layer (LL) (or an enhanced layer).

Figure 1:
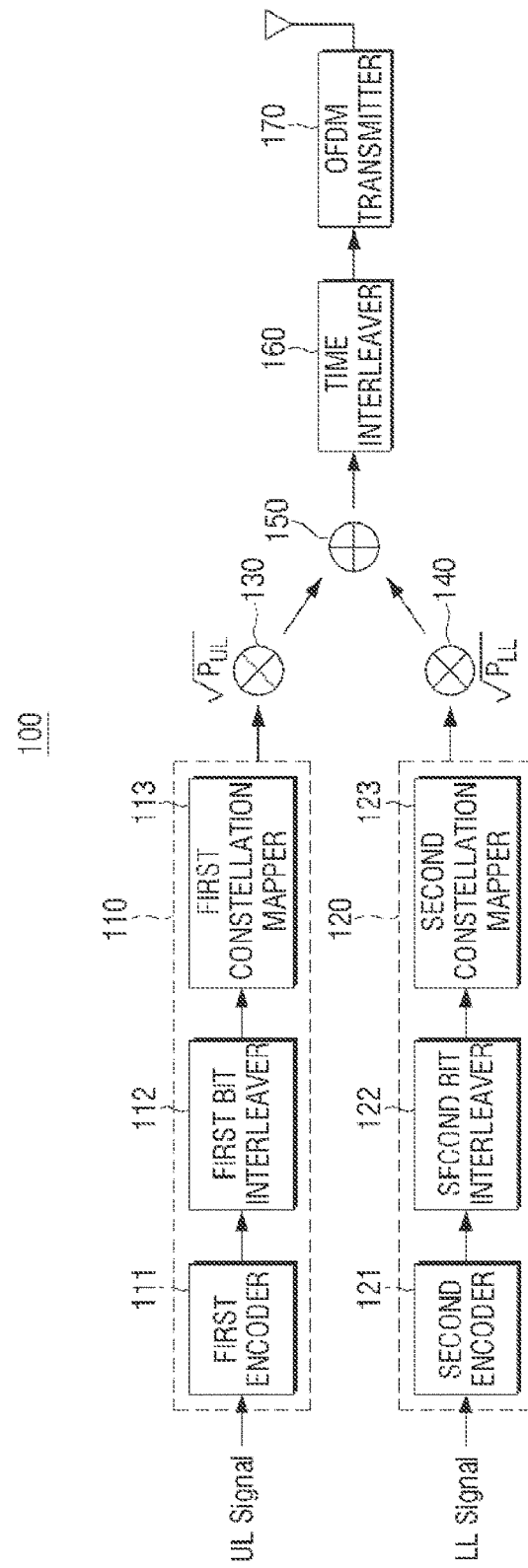
FIG. 1 is a block diagram illustrating a configuration of a transmitting apparatus according to an exemplary embodiment.

Meanwhile, a transmitting apparatus generating and transmitting the LDM signal may include components as illustrated in FIG. 1. However, a transmitting apparatus 100 illustrated in FIG. 1 is merely an example, and some of the components illustrated in FIG. 1 may be omitted or components for other processing may be added.

Referring to FIG. 1, the transmitting apparatus 100 may include a first bit interleaved coded modulation (BICM) encoder 110, a second BICM encoder 120, a first gain controller 130, a second gain controller 140, a time interleaver 150, and an orthogonal frequency division multiplexing (OFDM) transmitter 160.

The first BICM encoder 110 may include a first encoder 111, a first bit interleaver 112, and a first constellation mapper 113 to encode and interleave information word bits transmitted through the upper layer (herein, the information word bits, which are data, correspond to the UL signal of FIG. 1), modulate the encoded and interleaved information word bits, and map the modulated information word bits to constellation points.

In addition, the second BICM encoder 120 may include a second encoder 121, a second bit interleaver 122, and a second constellation mapper 123 to encode and interleave information word bits transmitted through the lower layer (herein, the information word bits, which are data, correspond to the LL signal of FIG. 1), modulate the encoded and interleaved information word bits, and map the modulated information word bits to constellation points.

In this case, the first and second encoders 111 and 121 may include an outer encoder (not shown) and an inner encoder (not shown) to encode the information word bits using a concatenated code.

Here, as an outer code performed before an inner code in the concatenated code, a Bose, Chaudhuri, Hocquenghem (BCH) code may be used, and as the inner code, a low density parity check (LDPC) code may be used.

To this end, the first and second encoders 111 and 121 may include a BCH encoder (not shown) and an LDPC encoder (not shown).

In this case, the BCH encoder (not shown) may perform BCH encoding for the information word bits to generate BCH parity bits, and the LDPC encoder (not shown) may perform LDPC encoding for a BCH codeword including the information code bits and BCH parity bits, that is, LDPC information word bits to generate LDPC parity bits.

Figure 2:
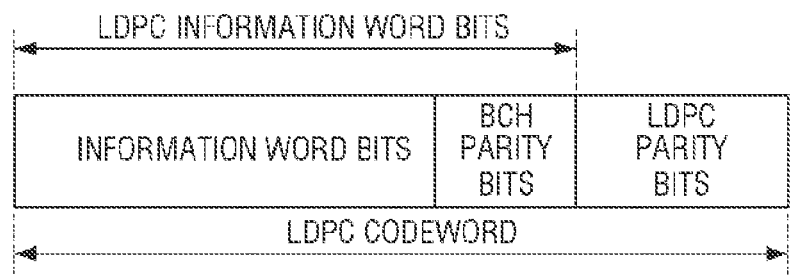
FIG. 2 is a diagram illustrating an LDPC codeword according to an exemplary embodiment.

An LDPC codeword generated by such encoding may be represented as illustrated in FIG. 2. As illustrated in FIG. 2, the LDPC codeword may have a form in which the BCH parity bits and the LDPC parity bits are sequentially added to the information word bits.

Meanwhile, the LDPC encoder (not shown) may encode the LDPC information word bits according to various code rates to generate the LDPC codeword having various lengths.

For example, the LDPC encoder (not shown) may encode the LDPC information word bits at the code rates of 3/15, 4/15, 5/15, 6/15, 7/15, 8/15, 9/15, 10/15, 11/15, 12/15, and 13/15 to generate the LDPC codeword having the length of 16200 or 64800.

Meanwhile, although the example described above illustrates the case in which the BCH is used as the outer code, this is merely one example, and a cyclic redundancy check (CRC) code instead of the BCH code may also be used.

In this case, the first and second encoders 111 and 121 may include a CRC encoder (not shown) and an LDPC encoder (not shown).

Specifically, the CRC encoder (not shown) may perform CRC encoding for the information word bits to generate CRC parity bits, and the LDPC encoder (not shown) may perform LDPC encoding for a CRC codeword including the information word bits and CRC parity bits, that is, LDPC information word bits to generate LDPC parity bits. The LDPC codeword generated by such encoding may have a form in which the CRC parity bits and the LDPC parity bits are sequentially added to the information word bits.

According to an exemplary embodiment, however, the first and second encoders 111 and 121 may or may not include both the BCH encoder (not shown) and the CRC encoder (not shown).

Meanwhile, the first gain controller 130 may adjust power of a signal output from the first BICM encoder 110 by multiplying a gain value $\sqrt{P_{UL}}$ with the signal output from the first BICM encoder 110, and may adjust power of a signal output from the second BICM encoder 120 by multiplying a gain value $\sqrt{P_{LL}}$ with the signal output from the second BICM encoder 120. In this case, $\sqrt{P_{UL}}^2 + \sqrt{P_{LL}}^2 = 1$.

In addition, the signal of which the power is adjusted by the first and second gain controllers 130 and 140 may be overlapped with each other by the adder 150, the time interleaver 160 may interleave constellation points to which the signal output from the adder 150 is mapped, that is, cells, and the OFDM transmitter 170 may map the interleaved cells to an OFDM frame to transmit the mapped cells to the receiving apparatus 1000.

Figure 3:
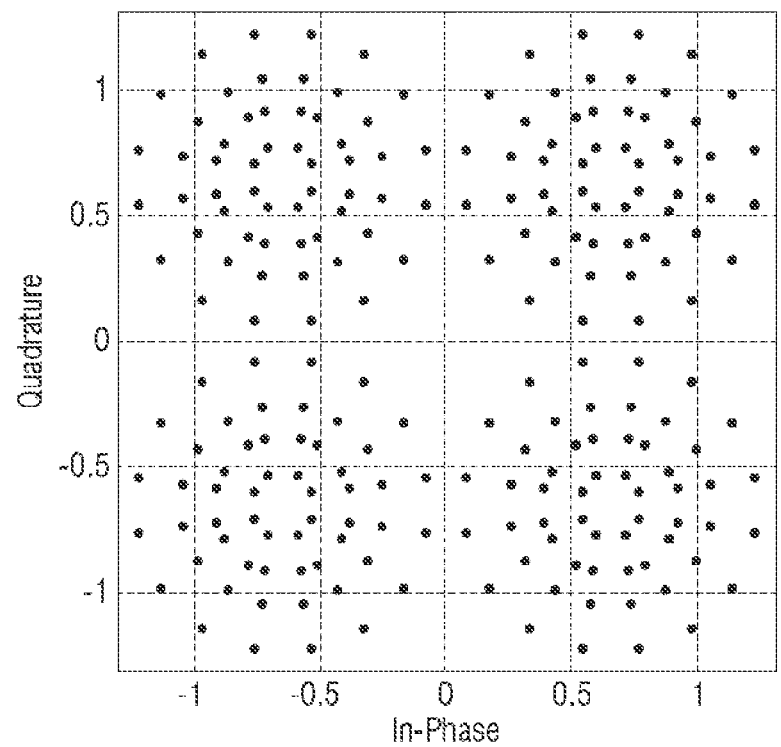
FIG. 3 is a diagram illustrating a constellation for an LDM signal.

In this case, one example of the constellation for the LDM signal may be represented as illustrated in FIG. 3.

FIG. 3 illustrates a case in which the upper layer signal is modulated with quadrature phase shift keying (QPSK), and lower layer signal is modulated with 64-quadrature amplitude modulation (64-QAM), by way of example. As such, in the LDM signal, the constellation points for the lower layer signal having the relatively small power are overlapped with each other based on the constellation points for the upper layer signal having the relatively large power.

However, FIG. 3 describes the case in which the upper layer signal is modulated with the QPSK, and the lower layer signal is modulated with the 64-QAM, but this is merely one example. That is, the upper layer signal may be modulated with the QPSK, and the lower layer signal may also be modulated with 256-QAM.

Meanwhile, FIG. 1 describes the case in which the power for each of the signal output from the first BICM encoder 110 and the signal output from the second BICM encoder 120 is adjusted, and the signals having the adjusted power are then overlapped with each other.

Figure 4:
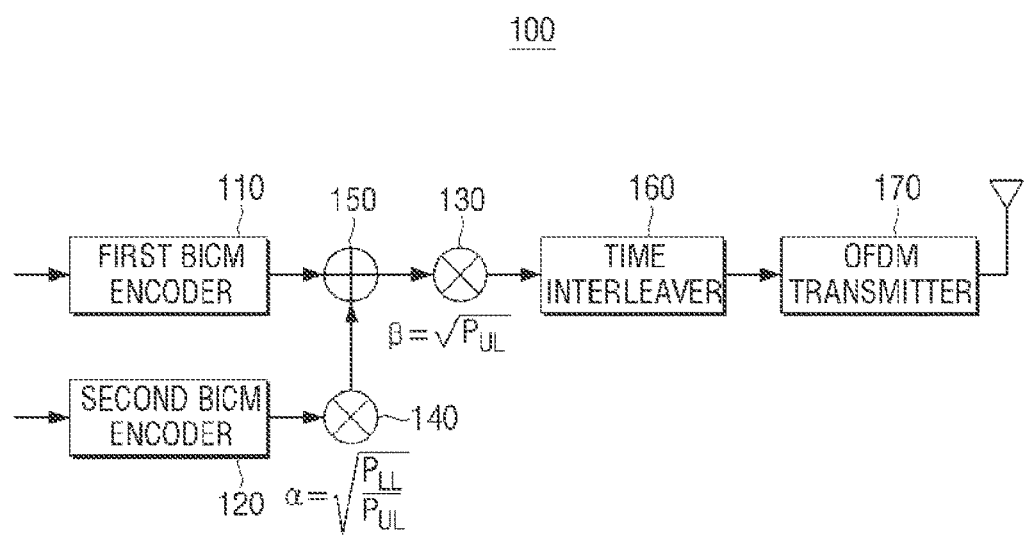
FIG. 4 is a block diagram illustrating a configuration of a transmitting apparatus according to an exemplary embodiment.

However, as illustrated in FIG. 4, power of a signal output from a second BICM encoder 120 is first adjusted, the signal having the adjusted power and a signal output from a first BICM encoder 110 are added by an adder 150, and power of the overlapped signal may be then adjusted. In this case, a gain value of a first gain controller 130 may be $\sqrt{P_{UL}}$, and a gain value of a second gain controller 140 may be $$\sqrt{\frac{P_{LL}}{P_{UL}}}.$$

Meanwhile, an LDPC encoding process refers to a process of generating an LDPC codeword satisfying $H \cdot C^T = 0$ for LDPC information word bits. Here, H denotes a parity check matrix, and C denotes the LDPC codeword. That is, the LDPC encoding process refers to a process of generating parity bits in which a summation obtained by multiplying respective columns of the parity check matrix with respective LDPC codeword bits becomes a '0' vector.

Accordingly, the transmitting apparatus 100 may prestore the parity check matrix using a memory (not shown), and LDPC encoders (not shown) of the first and second encoders 111 and 121 may encode the LDPC information word bits using the parity check matrix.

Figure 5:
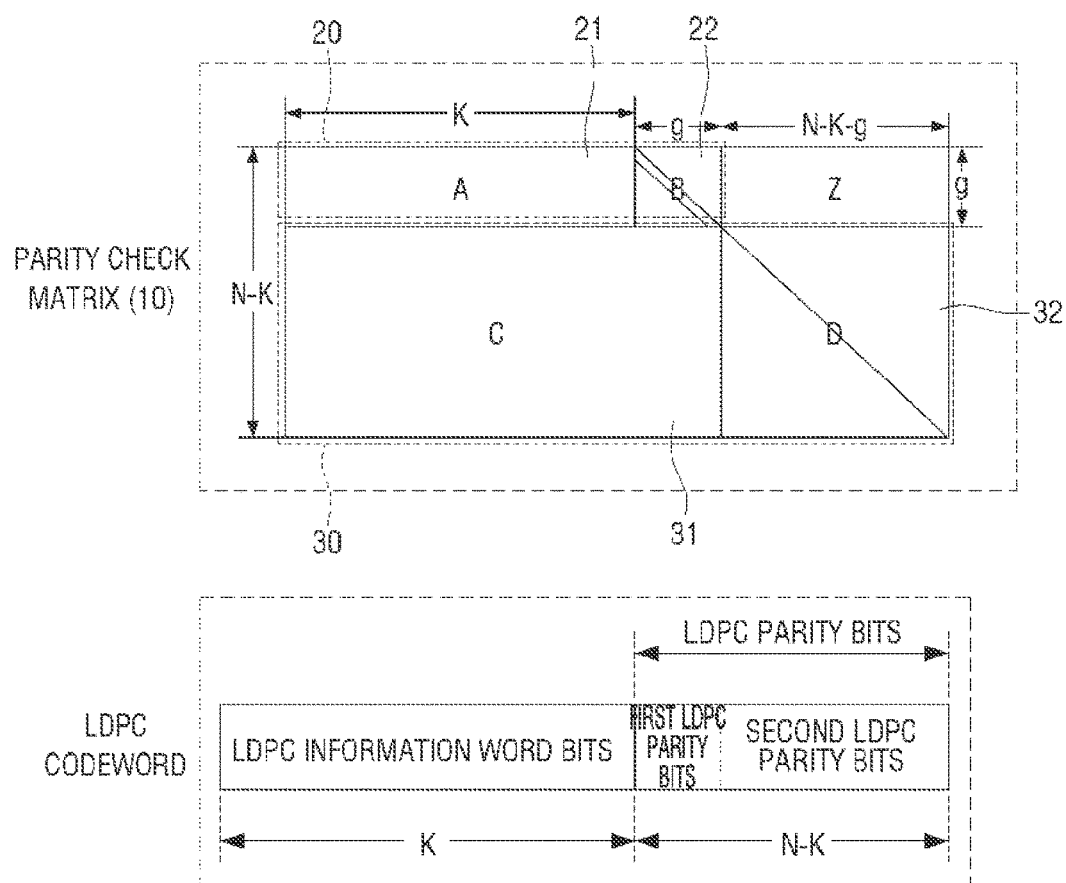
FIG. 5 is a diagram illustrating a structure a parity check matrix according to an exemplary embodiment.

Meanwhile, a parity check matrix according to an exemplary embodiment may have a structure as illustrated in FIG. 5.

The parity check matrix 10 illustrated in FIG. 5 has the same structure as the parity check matrix defined in an advanced television system committee (ATSC) 3.0 standard. Hereinafter, the parity check matrix 10 will be schematically described.

The parity check matrix 10, which is a matrix having 0 and 1 as entries, includes a first parity check matrix 20 and a second parity check matrix 30.

Here, the first parity check matrix 20 includes a first information word partial matrix (i.e., a matrix A) 21 and a first parity partial matrix (i.e., a matrix B) 22, and the second parity check matrix 30 includes a second information word partial matrix (i.e., a matrix C) 31 and a second parity partial matrix (i.e., a matrix D) 32.

Specifically, the matrixes A and C are matrixes corresponding to LDPC information word bits, wherein the matrix A may include K columns and g rows, and the matrix C may include K+g columns and N−k−g rows.

Here, K denotes the number of LDPC information word bits, and N denotes the number of LDPC codeword bits. In addition, g denotes the number of first LDPC parity bits, that is, the number of LDPC parity bits corresponding to the first parity partial matrix 22, and N−k−g denotes the number of second LDPC parity bits, that is, the number of LDPC parity bits corresponding to the second parity partial matrix 32.

Meanwhile, in the matrixes A and B, positions of the columns and rows at which 1 exist may be determined by a code rate and the number of LDPC codeword bits.

The matrixes B and D are matrixes corresponding to the first LDPC parity bits and the second LDPC parity bits, respectively. That is, the first LDPC parity bits may be generated based on the matrix B, and the second LDPC parity bits may be generated based on the matrix D.

Specifically, the matrix B is a dual diagonal matrix including g columns and g rows. Accordingly, since the number of 1 in the last column of the matrix B is one, and the number of 1 in the remaining columns except for the last column is two, a degree of the remaining columns except for the last column in the matrix B is 2, and the degree of the last column is 1.

The matrix D is a unit matrix (i.e., an identity matrix) including N−k−g columns and N−k−g rows. Accordingly, since the number of 1 in all of the columns is one, the degree of all of the columns in the matrix D is 1.

The matrix Z is a zero matrix including N−K−g columns and g rows. Accordingly, all entries of the matrix Z are 0.

Accordingly, the parity check matrix 10 may be defined by the matrixes A, B, C, D, and Z having the forms as described above, and the LDPC encoders (not shown) of the first and second encoders 111 and 121 may encode the LDPC information word bits using the parity check matrix having the structure as illustrated in FIG. 5.

Meanwhile, the receiving apparatus 1000 according to an exemplary embodiment may receive the LDM signal transmitted by the transmitting apparatus 100 to restore the information word bits transmitted through each of the layers.

In this case, the receiving apparatus 1000 may restore the information word bits transmitted through each of the layers using various methods, which will be described in detail below. Hereinafter, the first layer refers to the upper layer, and the second layer refers to the lower layer.

Figure 6:
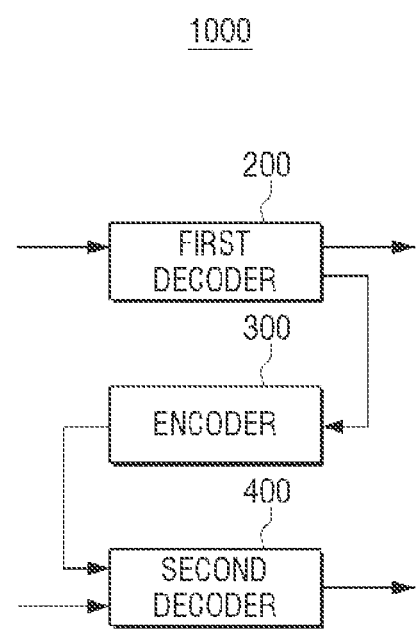
FIG. 6 is a block diagram illustrating a configuration of a receiving apparatus according to an exemplary embodiment.

FIG. 6 is a block diagram illustrating a configuration of a receiving apparatus according to an exemplary embodiment.

Referring to FIG. 6, the receiving apparatus 1000 may include a first decoder 200, an encoder 300, and a second decoder 400.

The first decoder 200 restores the information word bits transmitted through the first layer from the LDM signal.

That is, the first decoder 200 may decode a signal transmitted through a first layer from an LDM signal using a parity check matrix to restore LDPC information word bits and LDPC parity bits, and perform BCH decoding on the LDPC information word bits to restore information word bits transmitted through the first layer.

Specifically, the first decoder 200 may restore the LDPC information word bits and the LDPC parity bits which correspond to the signal transmitted through the first layer from the LDM signal using a first LDPC decoder (not shown), and may decode the LDPC information word bits using a first BCH decoder (not shown) to restore the information word bits transmitted through the first layer.

Meanwhile, the first decoder 200 may perform the LDPC decoding using the parity check matrix.

Here, the parity check matrix may be the same parity check matrix as that used when the transmitting apparatus 100 performs LDPC encoding on the LDPC information word bits to generate the first layer signal. That is, the parity check matrix used when the first decoder 200 performs the LDPC decoding may have the same form as the parity check matrix of when the LDPC encoder of the first encoder 111 of the transmitting apparatus 100 performs the LDPC encoding.

The encoder 300 may encode the LDPC information word bits using a parity check matrix to generate LDPC parity bits.

Here, the parity check matrix used by the encoder 300 may be the same parity check matrix as that used when the transmitting apparatus 100 performs the LDPC encoding for the LDPC information word bits to generate the first layer signal. That is, the parity check matrix used when the encoder 300 performs LDPC encoding may have the same form as the parity check matrix of when the LDPC encoder of the first encoder 111 of the transmitting apparatus 100 performs the LDPC encoding.

In this case, the encoder 300 may encode the LDPC information word bits using the parity check matrix to generate all LDPC parity bits.

That is, the encoder 300 may encode the LDPC information word bits output from the first decoder 200 using an LDPC encoder (not shown), to thereby generate first parity bits corresponding to a first parity partial matrix of a parity check matrix and a second parity bits corresponding to a second parity partial matrix. Alternatively, the encoder 300 may perform BCH encoding on information word bits restored by the first decoder 200 using a BCH encoder (not shown) to generate BCH parity bits, and may perform LDPC encoding on LDPC information word bits including the information word bits and the BCH parity bits using an LDPC encoder (not shown) to thereby generate first parity bits corresponding to the first parity partial matrix of the parity check matrix and second parity bits corresponding to the second parity partial matrix.

Meanwhile, the encoder 300 may also encode the LDPC information word bits using the parity check matrix to generate some of the LDPC parity bits.

Specifically, the encoder 300 may also encode the LDPC information word bits using the parity check matrix to generate only the parity bits corresponding to a preset column in the parity check matrix.

That is, the encoder 300 may encode the LDPC information word bits output from the first decoder 200 using the LDPC encoder (not shown) to generate the parity bits corresponding to the preset column in the parity check matrix. Alternatively, the encoder 300 may perform the BCH encoding on the information word bits restored by the first decoder 200 using the BCH encoder (not shown) to generate the BCH parity bits, and may perform the LDPC encoding on the LDPC information word bits including the information word bits and the BCH parity bits using the LDPC encoder (not shown) to thereby generate the parity bits corresponding to the preset columns in the parity check matrix.

Meanwhile, the preset columns may be columns having the degree of 1 in the parity check matrix.

Accordingly, the encoder 300 may generate parity bits corresponding to the columns having the degree of 1 in the parity check matrix.

Specifically, referring to FIG. 5, the columns having the degree of 1 among 0-th column to an (N−1)-th column of the parity check matrix are a (K+g)-th column to the (N−1)-th column including the matrix Z and the second parity partial matrix 32, the encoder 300 may generate only the second parity bits corresponding to the columns having the degree of 1.

As such, generating of LDPC parity bits using the encoder 300 is to again restore the first layer signal.

In order to restore the bits transmitted through the second layer in the LDM system, the first layer signal needs to be removed from the LDM signal using successive interference cancellation (SIC), and a decoding needs to be performed for a signal obtained by removing the first layer signal from the LDM signal, that is, the second layer signal.

Accordingly, in order to restore the bits transmitted through the second layer, the receiving apparatus 1000 encodes the LDPC information word bits to generate the LDPC parity bits, and restores the signal corresponding to the first layer using the LDPC information word bits and the LDPC parity bits.

The second decoder 400 may restore the information word bits transmitted through the second layer from the signal obtained by removing the signal corresponding to the first layer from the LDM signal.

Here, the signal corresponding to the first layer may be a signal generated based on the LDPC information word bits and the LDPC parity bits.

That is, in the case in which the encoder 300 encodes the LDPC information word bits to generate all LDPC parity bits, the signal corresponding to the first layer may be generated based on the LDPC information word bits and all the LDPC parity bits generated by the encoding.

However, in the case in which the encoder 300 encodes the LDPC information word bits to generate only some of the LDPC parity bits, the signal corresponding to the first layer may be generated based on the LDPC information word bits generated by the first decoder 200, the remaining parity bits except for the LDPC parity bits generated by the encoder 300 among the LDPC parity bits decoded by the first decoder 200, and the LDPC parity bits generated by the encoder 300.

That is, in the case in which the encoder 300 generates only some of the LDPC parity bits, the receiving apparatus 1000 may generate the signal corresponding to the first layer using some of the LDPC parity bits decoded by the first decoder 200 and the LDPC parity bits generated by the encoder 300.

Meanwhile, the second decoder 400 may perform decoding using the same decoder as the first decoder 200 or using a separate decoder.

Specifically, the second decoder 400 may restore LDPC information word bits and LDPC parity bits which correspond to a signal transmitted through a second layer by decoding a signal obtained by removing the signal corresponding to the first layer from the LDM signal using the first LDPC decoder (not shown), and may decode the LDPC information word bits using the first BCH decoder (not shown) to restore information word bits transmitted through the second layer.

Here, the first LDPC decoder (not shown) and the first BCH decoder (not shown) may be the decoders used when the first decoder 200 performs the decoding.

Meanwhile, the second decoder 400 may restore the LDPC information word bits and the LDPC parity bits which correspond to the signal transmitted through the second layer by decoding the signal obtained by removing the signal corresponding to the first layer from the LDM signal using a second LDPC decoder (not shown), and may decode the LDPC information word bits using a second BCH decoder (not shown) to restore the information word bits transmitted through the second layer.

Here, the second LDPC decoder (not shown) and the second BCH decoder (not shown) may be separate components which are different from the first LDPC decoder (not shown) and the first BCH decoder (not shown) used by the first decoder 200.

Meanwhile, the second decoder 400 may perform the LDPC decoding using the parity check matrix.

Here, the parity check matrix may be the same parity check matrix as that used when the transmitting apparatus 100 performs the LDPC encoding for the LDPC information word bits to generate the second layer signal. That is, the parity check matrix used when the second decoder 400 performs the LDPC decoding may have the same form as the parity check matrix of when the LDPC encoder of the second encoder 121 of the transmitting apparatus 100 performs the LDPC encoding.

Meanwhile, the first and second LDPC decoders (not shown) may decode the bits using an iterative decoding algorithm based on a sum-product algorithm.

Specifically, the sum-product algorithm is a kind of message passing algorithm, and the message passing algorithm represents an algorithm that exchanges messages (e.g., a log likelihood ration (LLR) value) through an edge on a bipartite graph, and calculate an output message from the messages input to a variable node or a check node to update the calculated output message.

Hereinafter, a decoding method using a message passing operation will be described. However, since the above-mentioned decoding method is already known, it will be briefly described.

Figure 7:
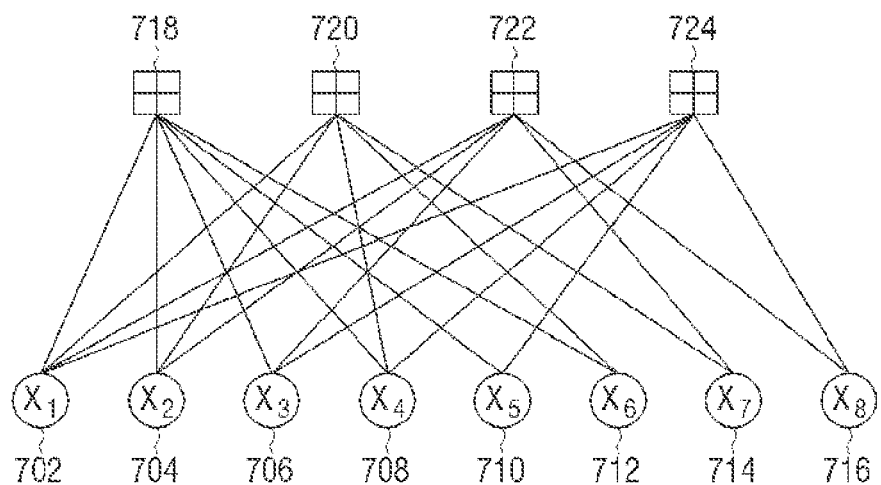

First, FIG. 7 is a diagram illustrating a graph representation method of an LDPC code.

FIG. 7 is a diagram illustrating an example of a parity check matrix $H_1$ of the LDPC code including four rows and eight columns, and illustrating the parity check matrix as a tanner graph. Referring to FIG. 7, since the parity check matrix $H_1$ has the eight columns, it generates a codeword having a length of 8, a code generated by $H_1$ means the LDPC code, and each of the columns corresponds to encoded 8 bits.

Referring to FIG. 7, the tanner graph of the LDPC code performing an encoding and a decoding based on the parity check matrix $H_1$ includes eight variable nodes, that is, $x_1$ (702), $x_2$ (704), $x_3$ (706), $x_4$ (708), $x_5$ (710), $x_6$ (712), $x_7$ (714), and $x_8$ (716), and four check nodes 718, 720, 722, and 724. Here, an i-th column and a j-th row of the parity check matrix $H_1$ of the LDPC code correspond to a variable node $x_i$ and a j-th check node, respectively. In addition, a value of 1 of a point at which a j-th column and a j-th row of the parity check matrix $H_1$ of the LDPC code intersect with each other, that is, a value which is not 0, means that there is an edge connecting the variable node xi and the j-th check node on the tanner graph as illustrated in FIG. 7.

The degrees of the variable node and the check node in the tanner graph of the LDPC code mean the number of edges connected to the respective nodes, and this is equal to the number of entries which are not 0 in the column and the row corresponding to the relevant node in the parity check matrix of the LDPC code. For example, the degrees of the variable nodes $x_1$ (702), $x_2$ (704), $x_3$ (706), $x_4$ (708), $x_5$ (710), $x_6$ (712), $x_7$ (714), and $x_8$ (716) in FIG. 7 is sequentially 4, 3, 3, 3, 2, 2, 2, and 2, respectively, and the degrees of the check nodes 718, 720, 722, and 724 is sequentially 6, 5, 5, and 5, respectively. In addition, the number of entries which are not 0 in the respective columns of the parity check matrix $H_1$ of FIG. 7 corresponding to the variable nodes of FIG. 7 are sequentially matched to the above-mentioned degrees 4, 3, 3, 3, 2, 2, 2, and 2, and the number of entries which are not 0 in the respective rows of the parity check matrix $H_1$ of FIG.

7 corresponding to the check nodes of FIG. 7 are sequentially matched to the above-mentioned degrees 6, 5, 5, and 5.

In this case, a value of an i-th bit may be determined based on a message of an i-th variable node. Both a hard decision and a soft decision for the value of the i-th bit are possible. Therefore, performance of $c_1$, which is the i-th bit of the LDPC codeword may correspond to performance of the i-th variable node of the tanner graph, and this may be determined according to a position and the number of 1 of the i-th column of the parity check matrix. That is, performance of bits included in the LDPC codeword depends on the position and the number of 1 of the parity check matrix.

Meanwhile, FIG. 8 illustrates a message passing operation which is generally used at the time of LDPC decoding, that is, a message passing operation at any check node and variable node.

A check node m 800 and a plurality of variable nodes 810, 820, 830, and 840 connected to the check node m 800 are illustrated in (1) of FIG. 8. In addition, $T_{n',m}$ illustrated in (1) of FIG. 8 represents a message passed from the variable node n' 810 to the check node 800, and $E_{n,m}$ represents a message passed from the check node m 800 to the variable node n 830. Here, a collection of all variable nodes connected to the check node m 800 is defined as N(m), and a collection that the variable node n 830 is excluded from N(m) is defined as N(m)\n.

In this case, a message update rule based on the sum-product algorithm may be represented by the following Mathematical Expression 1.

$$|E_{n,m}| = \Phi\left[\sum_{n' \in N(m)\setminus n} \Phi(|T_{n',m}|)\right] \quad (1)$$

$$\text{Sign}(E_{n,m}) = \prod_{n' \in N(m)\setminus n} \text{sign}(T_{n',m})$$

Here, $\text{Sign}(E_{n,m})$ represents a sign of the message $E_{n,m}$, and $|E_{n,m}|$ represents magnitude of the message $E_{n,m}$. Meanwhile, a function $\Phi(x)$ may be represented by the following Mathematical Expression 2.

$$\Phi(x) = -\log\left(\tanh\left(\frac{x}{2}\right)\right) \quad (2)$$

Meanwhile, a variable node x 850 and a plurality of check nodes 860, 870, 880, and 890 connected to the variable node x 850 are illustrated in (2) of FIG. 8. In addition, $E_{y',x}$ illustrated in (2) of FIG. 8 represents a message passed from a check node y' 860 to the variable node x 850, and $T_{y,x}$ represents a message passed from the variable node x 850 to the variable node y 880. Here, a collection of all variable nodes connected to the variable node x 850 is defined as M(x), and a collection that the check y 880 is excluded from M(m) is defined as M(x)\y.

In this case, a message update rule based on the sum-product algorithm may be represented by the following Mathematical Expression 3.

$$T_{y,x} = E_x + \sum_{y' \in M(x)\setminus y} E_{y',x} \quad (3)$$

Here, $E_x$ refers to an initial message value of the variable node x.

In addition, when a bit value of the node x is decided, the bit value may be represented by the following Mathematical Expression 4.

$$P_x = E_x + \sum_{y' \in M(x)} E_{y',x} \quad (4)$$

In this case, a coding bit corresponding to the node x may be decided according to a value of $P_x$.

As such, the first and second decoders (not shown) may restore the bits transmitted through the first and second layers using the passing between the variable nodes and the check nodes which are generated based on the parity check matrix. Here, the number of times the message is passed between the variable nodes and the check nodes, the number of iteration times may be preset in the system.

Meanwhile, the receiving apparatus 1000 may further include a tuner (not shown) for receiving the LDM signal transmitted from the transmitting apparatus through a channel, a synchronizer (not shown) for synchronizing the receiving LDM signal, an equalizer (not shown) for performing an equalization for the received LDM signal, and a cell demapper (not shown) for demapping the cells from the OFDM frame.

In addition, a signal $y_k$ transmitted through a k-th sub-carrier of a symbol of the OFDM frame may be represented as $y_k = h_k(\sqrt{P_{UL}}x_{kUL} + \sqrt{P_{LL}}x_{kLL}) + n_k$. Here, $h_k$ denotes a channel for the k-th sub-carrier, $n_k$ denotes noise for the k-th sub-carrier, $x_{kUL}$ denotes a first layer signal mapped to the k-th sub-carrier, $x_{kLL}$ and denotes a second layer signal mapped to the k-th sub-carrier. Hereinafter, various methods in which the information word bits transmitted through the respective layers are restored by processing the embedded LDM signal will be described in more detail with reference to the accompanying drawings.

Figure 9:
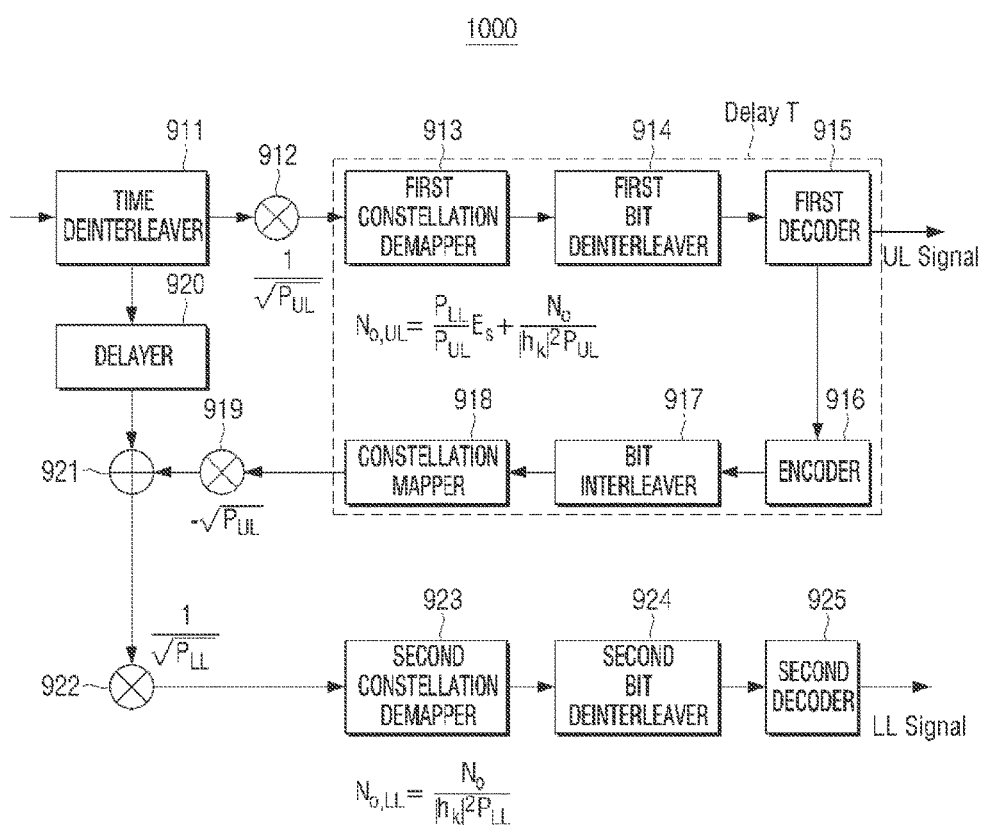
FIGS. 9 to 22 are block diagrams illustrating a detailed configuration of a receiving apparatus according to various exemplary embodiments.

FIG. 9 is a block diagram illustrating a detailed configuration of a receiving apparatus according to an exemplary embodiment.

Referring to FIG. 9, a receiving apparatus 1000 may include a time deinterleaver 911, a first gain controller 912, a first constellation demapper 913, a bit deinterleaver 914, a first decoder 915, an encoder 916, a bit interleaver 917, a constellation mapper 918, a second gain controller 919, a delayer 920, an adder 921, a third gain controller 922, a second constellation demapper 923, a second bit deinterleaver 924, and a second decoder 925.

The time deinterleaver 911 deinterleaves cells demapped from a symbol of an OFDM frame. Specifically, the time deinterleaver 911, which is a configuration corresponding to the time interleaver 160 of the transmitting apparatus 100 of FIG. 1, may inversely perform the operation performed by the time interleaver 160. That is, the time deinterleaver 911 may deinterleave the cells demapped from sub-carriers of the symbol, and may output the deinterleaved cells to the delayer 920 and the first gain controller 912.

The first gain controller 912 adjusts power of a signal output from the time deinterleaver 911.

Specifically, the first gain controller 912, which is a configuration corresponding to the first gain controller 130 of the transmitting apparatus 100, may multiply a gain value $$\frac{1}{\sqrt{P_{UL}}}$$

with the signal output from the time deinterleaver 911 to adjust the power of the signal output from the time deinterleaver 911, and may output the signal having the adjusted power to the first constellation demapper 913.

The first constellation demapper 913 may demodulate the signal output from the first gain controller 912, to thereby generate values corresponding to the bits transmitted through the first layer.

Specifically, the first constellation demapper 913 may demodulate the signal output from the first gain controller 912 based on a modulation scheme performed by the first constellation mapper 113 of the transmitting apparatus 100 to generate the values corresponding to the bits transmitted through the first layer, and may output the values to the first bit deinterleaver 914.

For example, in the case in which the first constellation mapper 113 of the transmitting apparatus 100 performs modulation with the QPSK scheme, the first constellation demapper 913 may demodulate the signal output from the first gain controller 912 using the QPSK scheme, to thereby generate values corresponding to the bits mapped to the constellation points.

Meanwhile, the value corresponding to the bits transmitted from the transmitting apparatus 100 is typically a value calculated based on possibility that the received bit is 0 and possibility that the received bit is 1, wherein each of the probabilities itself may be used as the value corresponding to each of the bits, and as another example, the value corresponding to the bits transmitted from the transmitting apparatus 100 may also be an LR or LLR value.

Specifically, the LR value means a ratio of the possibility that the bit transmitted from the transmitting apparatus 100 is 0 and the possibility that the bit transmitted from the transmitting apparatus 100 is 1, and the LLR value may be represented by a value obtained by taking Log to the ratio of the possibility that the bit transmitted from the transmitting apparatus 100 is 0 and the possibility that the bit transmitted from the transmitting apparatus 100 is 1.

Meanwhile, although the above-mentioned example describes the case in which the LR value or the LLR value is used, this is one example, and the received signal itself may also be used.

The first bit deinterleaver 914 may deinterleave the signal output from the first constellation demapper 913.

Specifically, the first bit deinterleaver 914 may inversely perform the operation performed by the first bit interleaver 112 of the transmitting apparatus 100, to thereby deinterleave the value corresponding to the bits and to output the deinterleaved values to the first decoder 915.

The first decoder 915 may restore the information word bits transmitted through the first layer using the values output from the first bit deinterleaver 914.

To this end, the first decoder 915 may include a first LDPC decoder (not shown) and a first BCH decoder (not shown).

Specifically, the first LDPC decoder (not shown) may perform LDPC decoding using the values output from the first bit deinterleaver 914 using a method corresponding to the LDPC encoding performed by the LDPC encoder (not shown) of the first encoder 111 of the transmitting apparatus 100. That is, the first LDPC decoder (not shown) may perform the LDPC decoding using the values output from the first bit deinterleaver 914 based on the parity check matrix used when the LDPC encoder (not shown) of the first encoder 111 performs the LDPC encoding, to thereby generate or restore LDPC information word bits and LDPC parity bits from the first layer signal.

In addition, the first BCH decoder (not shown) may perform BCH decoding on the LDPC information word bits decoded by the first LDPC decoder (not shown) using a method corresponding to the BCH encoding performed by the BCH encoder (not shown) of the first encoder 111 of the transmitting apparatus 100, to thereby generate or restore information word bits transmitted through the first layer.

Through the above-mentioned operations, the receiving apparatus 1000 may receive the information word bits transmitted through the first layer signal.

Meanwhile, the encoder 916 may encode the information word bits restored by the first decoder 915 to generate parity bits.

To this end, the encoder 916 may include an LDPC encoder (not shown) and a BCH encoder (not shown).

Specifically, the BCH encoder (not shown) performs BCH encoding on the information word bits using the method performed by the BCH encoder (not shown) of the first encoder 111 of the transmitting apparatus 100 to generate BCH parity bits.

In addition, the LDPC encoder (not shown) may perform LDPC encoding on the LDPC information word bits including the information word bits and the BCH parity bits using the method performed by the LDPC encoder (not shown) of the first encoder 111 of the transmitting apparatus 100 to generate LDPC parity bits, and may output an LDPC codeword including the LDPC information word bits and the LDPC parity bits to the bit interleaver 917.

In this case, the LDPC encoder (not shown) may encode the LDPC information word bits based on the parity check matrix used when the LDPC encoder (not shown) of the first encoder 111 performs the LDPC encoding to generate the LDPC parity bits.

The bit interleaver 917 may interleave the bits output from the encoder 916.

Specifically, the bit interleaver 917, which is a configuration corresponding to the first bit interleaver 112 of the transmitting apparatus 100, may interleave the LDPC codeword output from the encoder 916 using the same method as that performed by the first bit interleaver 112, and may output the interleaved LDPC codeword bits to the constellation mapper 918.

The constellation mapper 918 may modulate the bits output from the bit interleaver 917 to be mapped to constellation points.

Specifically, the constellation mapper 918, which is a configuration corresponding to the first constellation mapper 113 of the transmitting apparatus 100, may modulate the bits output from the bit interleaver 917 using the same method as that performed by the first constellation mapper 113 to be mapped to the constellation points, and may output a signal corresponding to the constellation points to the second gain controller 919.

For example, in the case in which the first constellation mapper 113 performs the modulation using the QPSK scheme, the constellation mapper 918 may modulate the bits output from the bit interleaver 917 with the QPSK scheme.

The second gain controller 919 adjusts power of the signal output from the constellation mapper 918.

Specifically, the second gain controller 919, which is a configuration corresponding to the first gain controller 130 of the transmitting apparatus 100, may multiply a gain value $-\sqrt{P_{UL}}$ with the signal output from the constellation mapper 918 to adjust the power of the signal output from the constellation mapper 918, and may output a signal having the adjusted power to the adder 923.

The delayer 920 may delay the signal output from the time deinterleaver 911 to output the delayed signal.

Specifically, the delayer 922 may delay the signal output from the time deinterleaver 911 as much as a time (Delay T) obtained by summing all times taken to perform a signal processing at the first constellation demapper 913, the first bit deinterleaver 914, the first decoder 915, the encoder 916, the bit interleaver 917, and the constellation mapper 918 to output the delayed signal to the adder 921.

The adder 921 may sum the signal output from the delayer 920 and the signal output from the second gain controller 919, and may output a summed signal to the third gain controller 922. Accordingly, the signal output from the adder 921 may be a signal obtained by removing the first layer signal from the LDM signal, that is, the second layer signal.

The third gain controller 922 adjusts power of the signal output from the adder 921.

Specifically, the third gain controller 922, which is a configuration corresponding to the second gain controller 140 of the transmitting apparatus 100, may multiply a gain value $$\frac{1}{\sqrt{P_{LL}}}$$

with the signal output from the adder 921 to adjust the power of the signal output from the adder 921, and may output a signal having the adjusted power to the second constellation demapper 923.

The second constellation demapper 923 may demodulate the signal output from the third gain controller 922, to thereby generate values corresponding to the bits transmitted through the second layer.

Specifically, the second constellation demapper 923 may demodulate the signal output from the third gain controller 922 based on the modulation scheme performed by the second constellation mapper 123 of the transmitting apparatus 100 to generate the values corresponding to the bits transmitted through the second layer, and may output the values to the second bit deinterleaver 924.

For example, in the case in which the second constellation mapper 123 of the transmitting apparatus 100 performs the modulation with the 64-QAM scheme, the second constellation demapper 923 may demodulate the signal output from the third gain controller 922 using the 64-QAM scheme, to thereby generate values corresponding to the bits mapped to the constellation points. As another example, in the case in which the second constellation mapper 123 of the transmitting apparatus 100 performs the modulation with the 256-QAM scheme, the second constellation demapper 923 may demodulate the signal output from the third gain controller 922 using the 256-QAM scheme, to thereby generate the values corresponding to the bits mapped to the constellation points.

The second bit deinterleaver 924 may deinterleave the signal output from the second constellation demapper 923.

Specifically, the second bit deinterleaver 924 may inversely perform the operation performed by the bit interleaver 122 of the transmitting apparatus 100, to thereby deinterleave the value corresponding to the bits and to output the deinterleaved values to the second decoder 925.

The second decoder 925 may restore the information word bits transmitted through the second layer using the values output from the second bit deinterleaver 924.

To this end, the second decoder 925 may include a second LDPC decoder (not shown) and a second BCH decoder (not shown).

Specifically, the second LDPC decoder (not shown) may perform LDPC decoding using the values output from the second bit deinterleaver 924 using a method corresponding to the LDPC encoding performed by the LDPC encoder (not shown) of the second encoder 121 of the transmitting apparatus 100. That is, the second LDPC decoder (not shown) may perform LDPC decoding using the values output from the second bit deinterleaver 924 based on the parity check matrix used when the LDPC encoder (not shown) of the second encoder 121 performs the LDPC encoding, to thereby restore LDPC information word bits and LDPC parity bits from the second layer signal.

In addition, the second BCH decoder (not shown) may perform BCH decoding on the LDPC information word bits decoded by the LDPC decoder (not shown) using a method corresponding to the BCH encoding performed by the BCH encoder (not shown) of the second encoder 121 of the transmitting apparatus 100, to thereby restore information word bits transmitted through the second layer.

Through the above-mentioned operations, the receiving apparatus 1000 may receive the information word bits transmitted through the second layer signal.

Meanwhile, although the above-mentioned example describes the case in which each of the first and second layer signals is processed using two forward error correction (FEC) blocks, the first and second layer signals may also be processed using one FEC block according to an exemplary embodiment. That is, the receiving apparatus 1000 may not separately include an LDPC decoder and a BCH decoder for processing each of the first layer signal and the second layer signal, but may perform a time-division processing for the first layer signal and the second layer signal using one LDPC decoder and one BCH decoder to decode the information word bits from the first layer signal and the second layer signal.

Here, a method for processing the first and second layer signals using one FEC block will be described in more detail with reference to FIG. 10.

Figure 10:
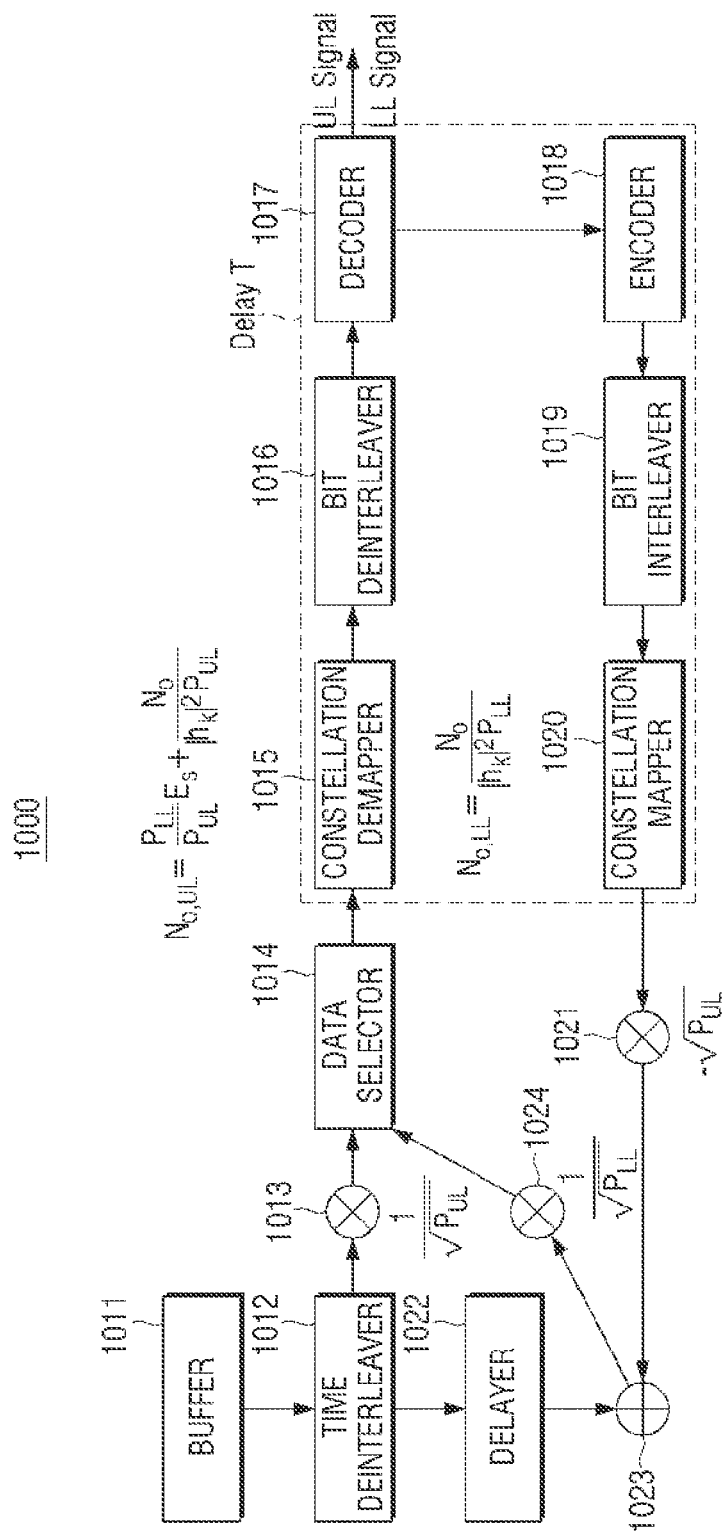

FIG. 10 is a block diagram illustrating a detailed configuration of a receiving apparatus according to an exemplary embodiment.

Referring to FIG. 10, a receiving apparatus 1000 may include a buffer 1011, a time deinterleaver 1012, a first gain controller 1013, a data selector 1014, a constellation demapper 1015, a bit deinterleaver 1016, a decoder 1017, an encoder 1018, a bit interleaver 1019, a constellation mapper 1020, a second gain controller 1021, a delayer 1022, an adder 1023, and a third gain controller 1024.

The buffer 1011 may store an LDM signal including a first layer signal and a second layer signal, and may sequentially output the LDM signal.

Specifically, the buffer 1011 may output the first layer signal and the second layer signal mapped to a k-th sub-carrier of a symbol of an OFDM frame to the time deinterleaver 1012, and may output the first layer signal and the second layer signal mapped to a (k+1)-th sub-carrier when information word bits are decoded from each of the first layer signal and the second layer signal mapped to the k-th sub-carrier by considering a time for which the information word bits are decoded from each of the first layer signal and the second layer signal, The time deinterleaver 1012 may deinterleave the signal output from the buffer 1011. Specifically, the time deinterleaver 1012, which is a configuration corresponding to the time interleaver 160 of the transmitting apparatus 100 of FIG. 1, may inversely perform the operation performed by the time interleaver 160. That is, the time deinterleaver 1012 may deinterleave cells demapped from the sub-carriers of the symbol, and may output the deinterleaved cells to the first gain controller 1013 and the delayer 1022.

The first gain controller 1013 adjusts power of a signal output from the time deinterleaver 1012.

Specifically, the first gain controller 1013, which is a configuration corresponding to the first gain controller 130 of the transmitting apparatus 100, may multiply a gain value $$\frac{1}{\sqrt{P_{UL}}}$$

with the signal output from the time deinterleaver 1012 to adjust the power of the signal output from the time deinterleaver 1012, and may output a signal having the adjusted power to the data selector 1014.

The data selector 1014 may receive the signals output from the first gain controller 1013 and the third gain controller 1024, and may select one of the signals to be output.

Specifically, in the case in which the first layer signal is to be decoded, the data selector 1014 may output the signal received from the first gain controller 1013 to the constellation demapper 1015.

The constellation demapper 1015 may demodulate the signal output from the data selector 1014, to thereby generate values corresponding to bits transmitted through each of the first layer and the second layer.

Specifically, in the case in which the first layer signal is to be decoded, the constellation demapper 1015 may demodulate the signal output from the data selector 1014 based on a modulation scheme performed by the first constellation mapper 113 of the transmitting apparatus 100 to generate values corresponding to the bits transmitted through the first layer, and may output the values to the bit deinterleaver 1016.

For example, in the case in which the first constellation mapper 113 of the transmitting apparatus 100 performs modulation with the QPSK scheme, the constellation demapper 1015 may demodulate the signal output from the data selector 1014 using the QPSK scheme, to thereby generate values corresponding to the bits mapped to the constellation points.

Meanwhile, the value corresponding to the bits transmitted from the transmitting apparatus 100 is typically a value calculated based on possibility that the received bit is 0 and possibility that the received bit is 1, wherein each of the probabilities itself may be used as the value corresponding to each of the bits, and as another example, the value corresponding to the bits transmitted from the transmitting apparatus 100 may also be an LR or LLR value.

Specifically, the LR value means a ratio of the possibility that the bit transmitted from the transmitting apparatus 100 is 0 and the possibility that the bit transmitted from the transmitting apparatus 100 is 1, and the LLR value may be represented by a value obtained by taking Log to the ratio of the possibility that the bit transmitted from the transmitting apparatus 100 is 0 and the possibility that the bit transmitted from the transmitting apparatus 100 is 1.

Meanwhile, although the above-mentioned example describes the case in which the LR value or the LLR value is used, this is one example, and the received signal itself may also be used.

The bit deinterleaver 1016 may deinterleave the signal output from the constellation demapper 1015.

Specifically, in the case in which the first layer signal is decoded, the bit deinterleaver 1016 may inversely perform the operation performed by the first bit interleaver 112 of the transmitting apparatus 100, to thereby deinterleave the value corresponding to the bits and to output the deinterleaved values to the decoder 1017.

The decoder 1017 may restore information word bits transmitted through the first layer using the values output from the bit deinterleaver 1016.

To this end, the decoder 1017 may include an LDPC decoder (not shown) and a BCH decoder (not shown).

Specifically, the LDPC decoder (not shown) may perform LDPC decoding using the values output from the bit deinterleaver 1016 using a method corresponding to the LDPC encoding performed by the LDPC encoder (not shown) of the first encoder 111 of the transmitting apparatus 100. That is, the LDPC decoder (not shown) may perform the LDPC decoding using the values output from the bit deinterleaver 1016 based on the parity check matrix used when the LDPC encoder (not shown) of the first encoder 111 performs the LDPC encoding, to thereby restore LDPC information word bits and LDPC parity bits from the first layer signal.

In addition, the BCH decoder (not shown) may perform BCH decoding on the LDPC information word bits decoded by the LDPC decoder (not shown) using a method corresponding to the BCH encoding performed by the BCH encoder (not shown) of the first encoder 111 of the transmitting apparatus 100, to thereby restore information word bits transmitted through the first layer.

Through the above-mentioned operations, the receiving apparatus 1000 may receive the information word bits transmitted through the first layer signal.

Meanwhile, the encoder 1018 may encode the information word bits restored by the decoder 1017 to generate parity bits.

To this end, the encoder 1018 may include an LDPC encoder (not shown) and a BCH encoder (not shown).

Specifically, the BCH encoder (not shown) performs BCH encoding on the information word bits using the method performed by the BCH encoder (not shown) of the first encoder 111 of the transmitting apparatus 100 to generate BCH parity bits.

In addition, the LDPC encoder (not shown) may perform LDPC encoding on the LDPC information word bits including the information word bits and the BCH parity bits using the method performed by the LDPC encoder (not shown) of the first encoder 111 of the transmitting apparatus 100 to generate LDPC parity bits, and may output an LDPC codeword including the LDPC information word bits and the LDPC parity bits to the bit interleaver 1019.

In this case, the LDPC encoder (not shown) may encode the LDPC information word bits based on the parity check matrix used when the LDPC encoder (not shown) of the first encoder 111 performs the LDPC encoding to generate the LDPC parity bits.

The bit interleaver 1019 may interleave the bits output from the encoder 1018.

Specifically, the bit interleaver 1019, which is a configuration corresponding to the first bit interleaver 112 of the transmitting apparatus 100, may interleave the LDPC codeword output from the encoder 1018 using the same method as that performed by the first bit interleaver 112, and may output the interleaved LDPC codeword bits to the constellation mapper 1020.

The constellation mapper 1020 may modulate the bits output from the bit interleaver 1019 to be mapped to constellation points.

Specifically, the constellation mapper 1020, which is a configuration corresponding to the first constellation mapper 113 of the transmitting apparatus 100, may modulate the bits output from the bit interleaver 1019 using the same method as that performed by the first constellation mapper 113 to be mapped to the constellation points, and may output a signal corresponding to the constellation points to the second gain controller 1021.

For example, in the case in which the first constellation mapper 111 performs the modulation using the QPSK scheme, the constellation mapper 1020 may modulate the bits output from the bit interleaver 1019 with the QPSK scheme.

The second gain controller 1021 adjusts power of the signal output from the constellation mapper 1020.

Specifically, the second gain controller 1021, which is a configuration corresponding to the first gain controller 130 of the transmitting apparatus 100, may multiply a gain value $-\sqrt{P_{UL}}$ with the signal output from the constellation mapper 1020 to adjust the power of the signal output from the constellation mapper 1020, and may output a signal having the adjusted power to the adder 1023.

The delayer 1022 may delay the signal output from the time deinterleaver 1012 to output the delayed signal.

Specifically, the delayer 1022 may delay the signal output from the time deinterleaver 1015 as much as a time (Delay T) obtained by summing all times taken to perform a signal processing at the constellation demapper 1015, the bit deinterleaver 1016, the decoder 1017, the encoder 1018, the bit interleaver 1019, and the constellation mapper 1020 to output the delayed signal to the adder 1023.

The adder 1023 may sum the signal output from the delayer 1022 and the signal output from the second gain controller 1021, and may output a summed signal to the third gain controller 1024. Accordingly, the signal output from the adder 1023 may be a signal obtained by removing the first layer signal from the LDM signal, that is, the second layer signal.

The third gain controller 1024 adjusts power of the signal output from the adder 1023.

Specifically, the third gain controller 1024, which is a configuration corresponding to the second gain controller 140 of the transmitting apparatus 100, may multiply a gain value $$\frac{1}{\sqrt{P_{LL}}}$$

with the signal output from the adder 1023 to adjust the power of the signal output from the adder 1023, and may output a signal having the adjusted power to the date selector 1014.

The data selector 1014 may receive the signals output from the first gain controller 1013 and the third gain controller 1024, and may select one of the signals to be output.

Specifically, in the case in which the second layer signal is to be decoded, the data selector 1024 may output the signal received from the third gain controller 1024 to the constellation demapper 1015.

The constellation demapper 1015 may demodulate the signal output from the data selector 1014, to thereby generate values corresponding to the bits transmitted through each of the layers.

Specifically, in the case in which the second layer signal is to be decoded, the constellation demapper 1015 may demodulate the signal output from the data selector 1014 based on the modulation scheme performed by the second constellation mapper 123 of the transmitting apparatus 100 to generate values corresponding to the bits transmitted through the second layer, and may output the values to the bit deinterleaver 1016.

For example, in the case in which the second constellation mapper 123 of the transmitting apparatus 100 performs the modulation with the 64-QAM scheme, the constellation demapper 1015 may demodulate the signal output from the data selector 1014 using the 64-QAM scheme, to thereby generate values corresponding to the bits mapped to the constellation points. As another example, in the case in which the second constellation mapper 123 of the transmitting apparatus 100 performs the modulation with the 256-QAM scheme, the constellation demapper 1015 may demodulate the signal output from the data selector 1014 using the 256-QAM scheme, to thereby generate values corresponding to the bits mapped to the constellation points.

The bit deinterleaver 1016 may deinterleave the signal output from the constellation demapper 1015.

Specifically, in the case in which the second layer signal is to be decoded, the bit deinterleaver 1016 may inversely perform the operation performed by the bit interleaver 122 of the transmitting apparatus 100, to thereby deinterleave the value corresponding to the bits and to output the deinterleaved values to the decoder 1017.

The decoder 1017 may restore the information word bits transmitted through the second layer using the values output from the bit deinterleaver 1016.

In this case, the decoder 1017 may perform decoding using the LDPC decoder (not shown) and the BCH decoder (not shown).

Specifically, the LDPC decoder (not shown) may perform LDPC decoding using the values output from the bit deinterleaver 1016 using a method corresponding to the LDPC encoding performed by the LDPC encoder (not shown) of the second encoder 121 of the transmitting apparatus 100. That is, the LDPC decoder (not shown) may perform the LDPC decoding using the values output from the bit deinterleaver 1016 based on the parity check matrix used when the LDPC encoder (not shown) of the second encoder 121 performs the LDPC encoding, to thereby restore LDPC information word bits and LDPC parity bits from the second layer signal.

In addition, the BCH decoder (not shown) may perform BCH decoding on the LDPC information word bits decoded by the LDPC decoder (not shown) using a method corresponding to the BCH encoding performed by the BCH encoder (not shown) of the second encoder 121 of the transmitting apparatus 100, to thereby restore information word bits transmitted through the second layer.

Through the above-mentioned operations, the receiving apparatus 1000 may receive the information word bits transmitted through the second layer signal.

As described above, according to an exemplary embodiment, since separate FEC blocks for processing each of the layer signals are not used, but each of the layer signals is processed using one FEC block, complexity may be reduced in view of hardware.

Meanwhile, although FIGS. 9 and 10 describe the cases in which in order to restore the first layer signal, the BCH parity bits are generated by performing the BCH encoding on the information word bits restored from the received first layer signal, the LDPC parity bits are generated by performing the LDPC encoding the LDPC information word bits including the information word bits and the BCH parity bits, and the signal corresponding to the first layer is restored using the LDPC information word bits and the LDPC parity bits, this is merely one example.

That is, the receiving apparatus 1000 may also restore the signal corresponding to the first layer by performing only the LDPC encoding.

Specifically, the receiving apparatus 1000 may generate the LDPC parity bits by performing the LDPC encoding on the LDPC information word bits decoded from the first layer signal without separately performing the BCH encoding, and may restore the signal corresponding to the first layer using the LDPC information word bits and the LDPC parity bits.

Hereinafter, a more detailed description thereof will be provided with reference to FIGS. 11 and 12.

Figure 11:
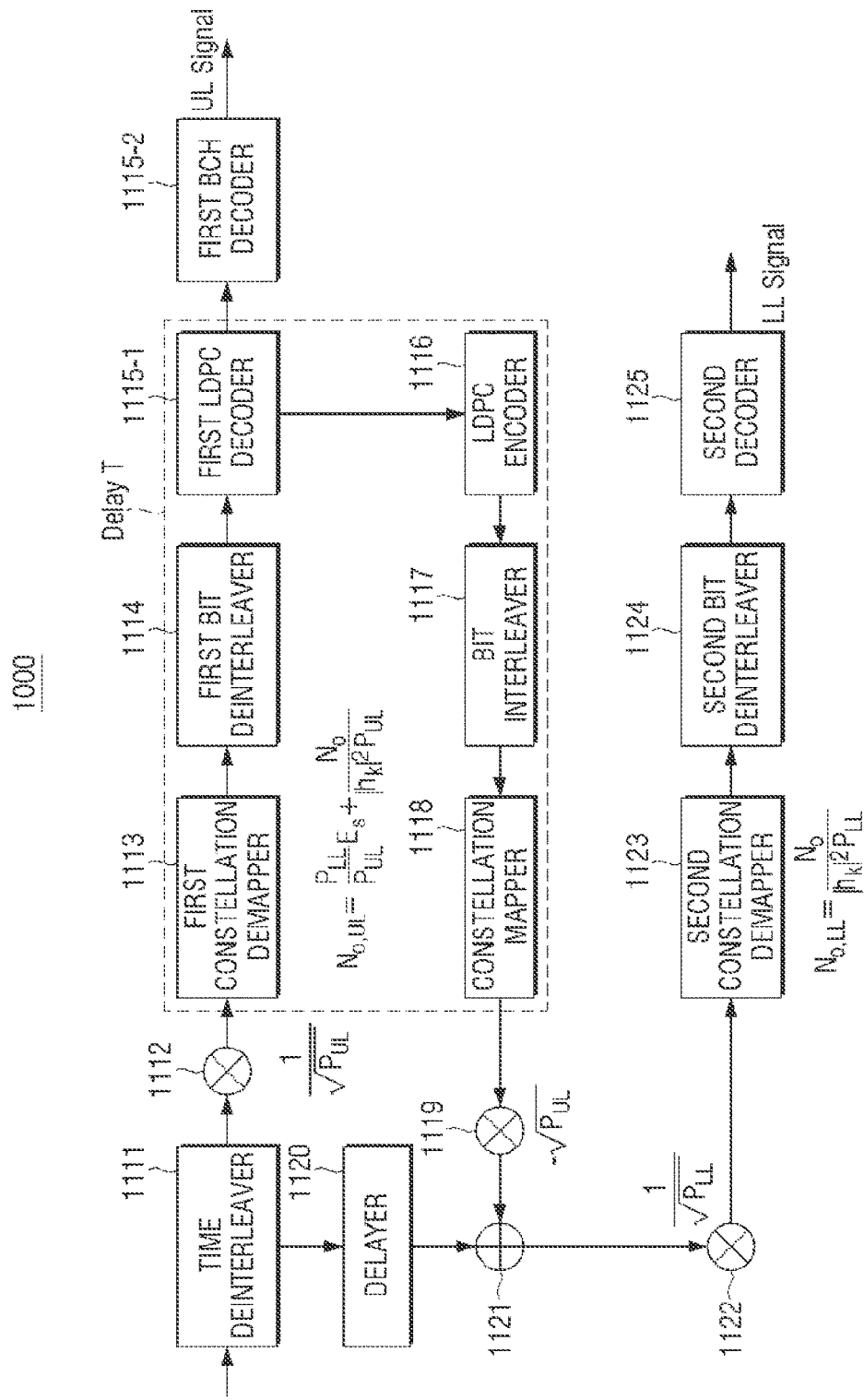

FIG. 11 is a block diagram illustrating a detailed configuration of a receiving apparatus according to an exemplary embodiment.

Referring to FIG. 11, a receiving apparatus 1000 may include a time deinterleaver 1111, a first gain controller 1112, a first constellation demapper 1113, a bit deinterleaver 1114, a first LDPC decoder 1115-1, a first BCH decoder 1115-2, an LDPC encoder 1116, a bit interleaver 1117, a constellation mapper 1118, a second gain controller 1119, a delayer 1120, an adder 1121, a third gain controller 1122, a second constellation demapper 1123, a second bit deinterleaver 1124, and a second decoder 1125.

Meanwhile, since the time deinterleaver 1111, the first gain controller 1112, the first constellation demapper 1113, the bit deinterleaver 1114, the bit interleaver 1117, the constellation mapper 1118, the second gain controller 1119, the delayer 1120, the adder 1121, the third gain controller 1122, the second constellation demapper 1123, the second bit deinterleaver 1124, and the second decoder 1125 illustrated in FIG. 11 perform the same operations as the time deinterleaver 911, the first gain controller 912, the first constellation demapper 913, the bit deinterleaver 914, the bit interleaver 917, the constellation mapper 918, the second gain controller 919, the delayer 920, the adder 921, the third gain controller 922, the second constellation demapper 923, the second bit deinterleaver 924, and the second decoder 925 described in FIG. 9, a detailed description thereof will be omitted.

However, since the signal corresponding to the first layer is restored by performing only the LDPC encoding in FIG. 11, the delayer 1120 delays the signal output from the time deinterleaver 1111 as much as a time (Delay T) obtained by summing all times taken to perform signal processing at the first constellation demapper 1113, the first bit deinterleaver 1114, the first LDPC decoder 1115, the LDPC encoder 1116, the bit interleaver 1117, and the constellation mapper 1118.

Meanwhile, the first LDPC decoder 1115-1 may perform LDPC decoding using the values output from the first bit deinterleaver 1114 using a method corresponding to the LDPC encoding performed by the LDPC encoder (not shown) of the first encoder 111 of the transmitting apparatus 100. That is, the first LDPC decoder 1115-1 may perform the LDPC decoding using the values output from the first bit deinterleaver 1111 based on the parity check matrix used when the LDPC encoder (not shown) of the first encoder 111 performs LDPC encoding, to thereby restore LDPC information word bits and LDPC parity bits from the first layer signal.

In addition, the first BCH decoder 1115-2 may perform BCH decoding on the LDPC information word bits restored by the first LDPC decoder 1115-1 with a scheme corresponding to the BCH encoding performed by the BCH encoder (not shown) of the first encoder 111 of the transmitting apparatus 100, to thereby restore information word bits transmitted through the first layer.

Meanwhile, the LDPC encoder 1116 may encode the LDPC information word bits restored by the first LDPC decoder 1115-1 to generate LDPC parity bits.

Specifically, the LDPC encoder 1116 may perform LDPC encoding on the LDPC information word bits by the LDPC encoding performed by the LDPC encoder (not shown) of the first encoder 111 of the transmitting apparatus 100 to generate the LDPC parity bits, and may output an LDPC codeword including the LDPC information word bits and the LDPC parity bits to the bit interleaver 1117.

In this case, the LDPC encoder 1116 may encode the LDPC information word bits based on the parity check matrix used when the LDPC encoder (not shown) of the first encoder 111 performs the LDPC encoding to generate the LDPC parity bits.

Figure 12:
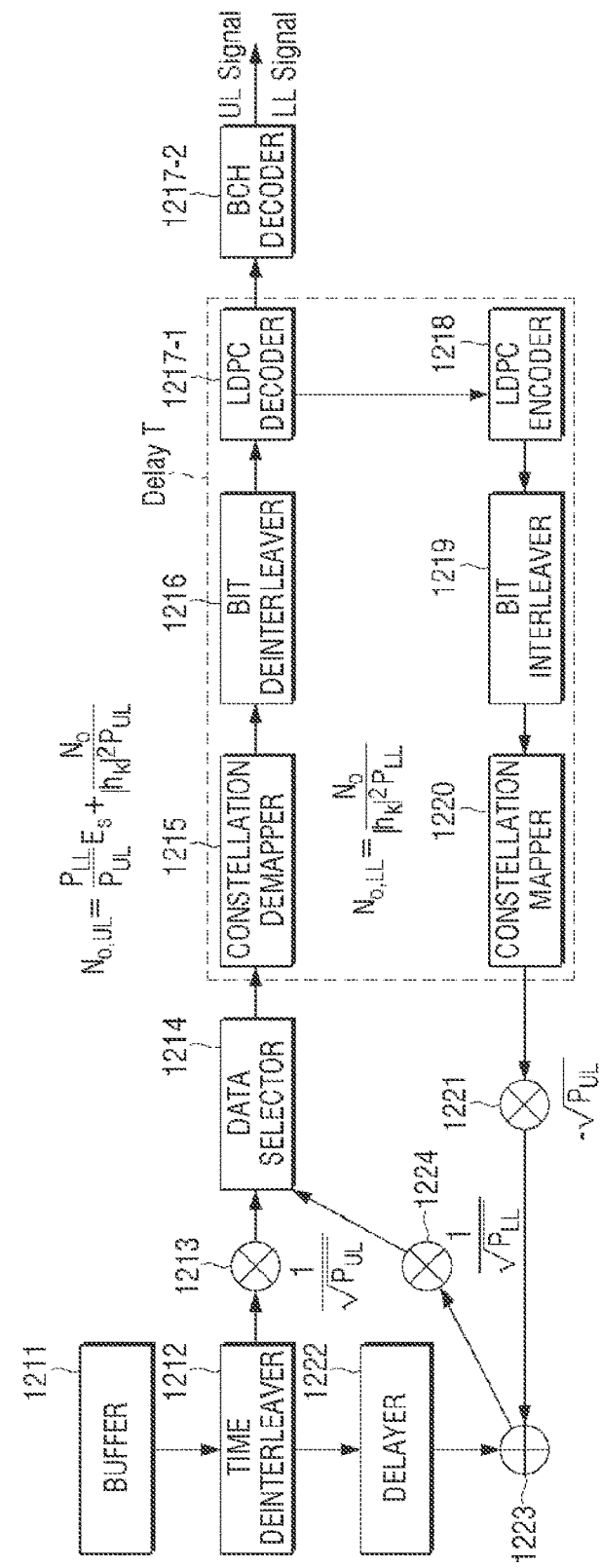

FIG. 12 is a block diagram illustrating a detailed configuration of a receiving apparatus according to an exemplary embodiment.

Referring to FIG. 12, a receiving apparatus 1000 may include a buffer 1211, a time deinterleaver 1212, a first gain controller 1213, a data selector 1214, a constellation demapper 1215, a bit deinterleaver 1216, an LDPC decoder 1217-1, a BCH decoder 1217-2, an LDPC encoder 1218, a bit interleaver 1219, a constellation mapper 1220, a second gain controller 1221, a delayer 1222, an adder 1223, and a third gain controller 1224.

Meanwhile, since the buffer 1211, the time deinterleaver 1212, the first gain controller 1213, the data selector 1214, the constellation demapper 1215, the bit deinterleaver 1216, the bit interleaver 1219, the constellation mapper 1220, the second gain controller 1221, the delayer 1222, the adder 1223, and the third gain controller 1224 illustrated in FIG. 12 perform the same operations as the buffer 1011, the time deinterleaver 1012, the first gain controller 1013, the data selector 1014, the constellation demapper 1015, the bit deinterleaver 1016, the bit interleaver 1019, the constellation mapper 1020, the second gain controller 1021, the delayer 1022, the adder 1023, and the third gain controller 1024 described in FIG. 10, a detailed description thereof will be omitted.

However, since the signal corresponding to the first layer is restored by performing only the LDPC encoding in FIG. 12, the delayer 1222 delays the signal output from the time deinterleaver 1212 as much as a time (Delay T) obtained by summing all times taken to perform a signal processing at the constellation demapper 1215, the bit deinterleaver 1216, the LDPC decoder 1217-1, the LDPC encoder 1218, the bit interleaver 1219, and the constellation mapper 1220.

Meanwhile, in the case in which the first layer signal is restored, the LDPC decoder 1217-1 and the BCH decoder 1217-2 may restore information word bits transmitted through the first layer.

Specifically, the LDPC decoder 1217-1 may perform LDPC decoding using the values output from the bit deinterleaver 1216 using a method corresponding to the LDPC encoding performed by the LDPC encoder (not shown) of the first encoder 111 of the transmitting apparatus 100. That is, the LDPC decoder 1217-1 may perform the LDPC decoding using the values output from the bit deinterleaver 1216 based on the parity check matrix used when the LDPC encoder (not shown) of the first encoder 111 performs the LDPC encoding, to thereby restore LDPC information word bits and LDPC parity bits from the first layer signal.

In addition, the BCH decoder 1217-2 may perform BCH decoding on the LDPC information word bits restored by the LDPC decoder 1217-1 using a method corresponding to the BCH encoding performed by the BCH encoder (not shown) of the first encoder 111 of the transmitting apparatus 100, to thereby restore the information word bits transmitted through the first layer.

Meanwhile, in the case in which the second layer signal is to be restored, the LDPC decoder 1217-1 and the BCH decoder 1217-2 may restore information word bits transmitted through the second layer.

Specifically, the LDPC decoder 1217-1 may perform the LDPC decoding using the values output from the bit deinterleaver 1216 using a method corresponding to the LDPC encoding performed by the LDPC encoder (not shown) of the second encoder 121 of the transmitting apparatus 100. That is, the LDPC decoder 1217-1 may perform the LDPC decoding using the values output from the bit deinterleaver 1216 based on the parity check matrix used when the LDPC encoder (not shown) of the second encoder 121 performs the LDPC encoding, to thereby restore LDPC information word bits and LDPC parity bits from the second layer signal.

In addition, the BCH decoder 1217-2 may perform BCH decoding on the LDPC information word bits restored by the LDPC decoder 1217-1 using a method corresponding to the BCH encoding performed by the BCH encoder (not shown) of the second encoder 121 of the transmitting apparatus 100, to thereby restore the information word bits transmitted through the second layer.

Meanwhile, the LDPC encoder 1218 may encode the LDPC information word bits decoded by the LDPC decoder 1217-1 to generate the LDPC parity bits.

Specifically, the LDPC encoder 1218 may perform the LDPC encoding on the LDPC information word bits by the LDPC encoding performed by the LDPC encoder (not shown) of the first encoder 111 of the transmitting apparatus 100 to generate the LDPC parity bits, and may output an LDPC codeword including the LDPC information word bits and the LDPC parity bits to the bit interleaver 1219.

In this case, the LDPC encoder 1218 may encode the LDPC information word bits based on the parity check matrix used when the LDPC encoder (not shown) of the first encoder 111 performs the LDPC encoding to generate the LDPC parity bits.

As described above, according to the methods described in FIGS. 11 and 12, since the signal corresponding to the first layer is restored by performing the LDPC encoding on the LDPC information word bits decoded from the first layer signal without separately performing the BCH encoding, the time taken to restore the second layer signal may be shortened.

Meanwhile, in FIGS. 9 to 12, the LDPC encoder generates all LDPC parity bits using the LDPC encoding.

However, in FIGS. 9 to 12, the LDPC encoder may generate the LDPC parity bits corresponding only to the columns having the degree of 1 in the parity check matrix, and the bit interleaver may also interleave an LDPC codeword bits including the LDPC information word bits, the LDPC parity bits generated by the LDPC encoder, and LDPC parity bits corresponding to the columns other than the columns having the degree of 1 in the parity check matrix among the LDPC parity bits restored by the LDPC decoder.

For example, since the structure of the parity check matrix used at the time of the LDPC encoding in the transmitting apparatus 100 is equal to that of FIG. 5, the LDPC encoder generates second LDPC parity bits $(p_0', p_1', \ldots, p_{N-K-g-1}')$ corresponding to the columns having the degree of 1 in the parity check matrix, that is, the second parity partial matrix.

Here, it is assumed that the LDPC information word bits are $(i_0, i_1, \ldots, i_{K-1})$, and LDPC parity bits other than the second LDPC parity bits in the LDPC parity bits, that is, the first LDPC parity bits are $(p_0, p_1, \ldots, p_{g-1})$.

In this case, the bit interleaver may interleave the LDPC codeword bits $(i_0, i_1, \ldots, i_{K-1}, p_0, p_1, p_{g-1}, p_0', p_1', \ldots, p_{N-K-g-1}')$ including the LDPC information word bits $(i_0, i_1, \ldots, i_{K-1})$, the first LDPC parity bits $(p_0, p_1, \ldots, p_{g-1})$ among the LDPC parity bits decoded by the LDPC decoder, and the second LDPC parity bits $(p_0', p_1', \ldots, p_{N-K-g-1}')$ generated by the LDPC encoding, and the constellation mapper may modulate the interleaved LDPC codeword bits to be mapped to the constellation points, and may generate the signal corresponding to the first layer.

Meanwhile, although the above-mentioned example describes the case in which the LDPC parity bits are generated using the LDPC encoding in order to restore the signal corresponding to the first layer, this is merely one example. That is, as illustrated in FIGS. 13 to 16, the signal corresponding to the first layer may also be restored without separately performing the LDPC encoding.

Figure 13:
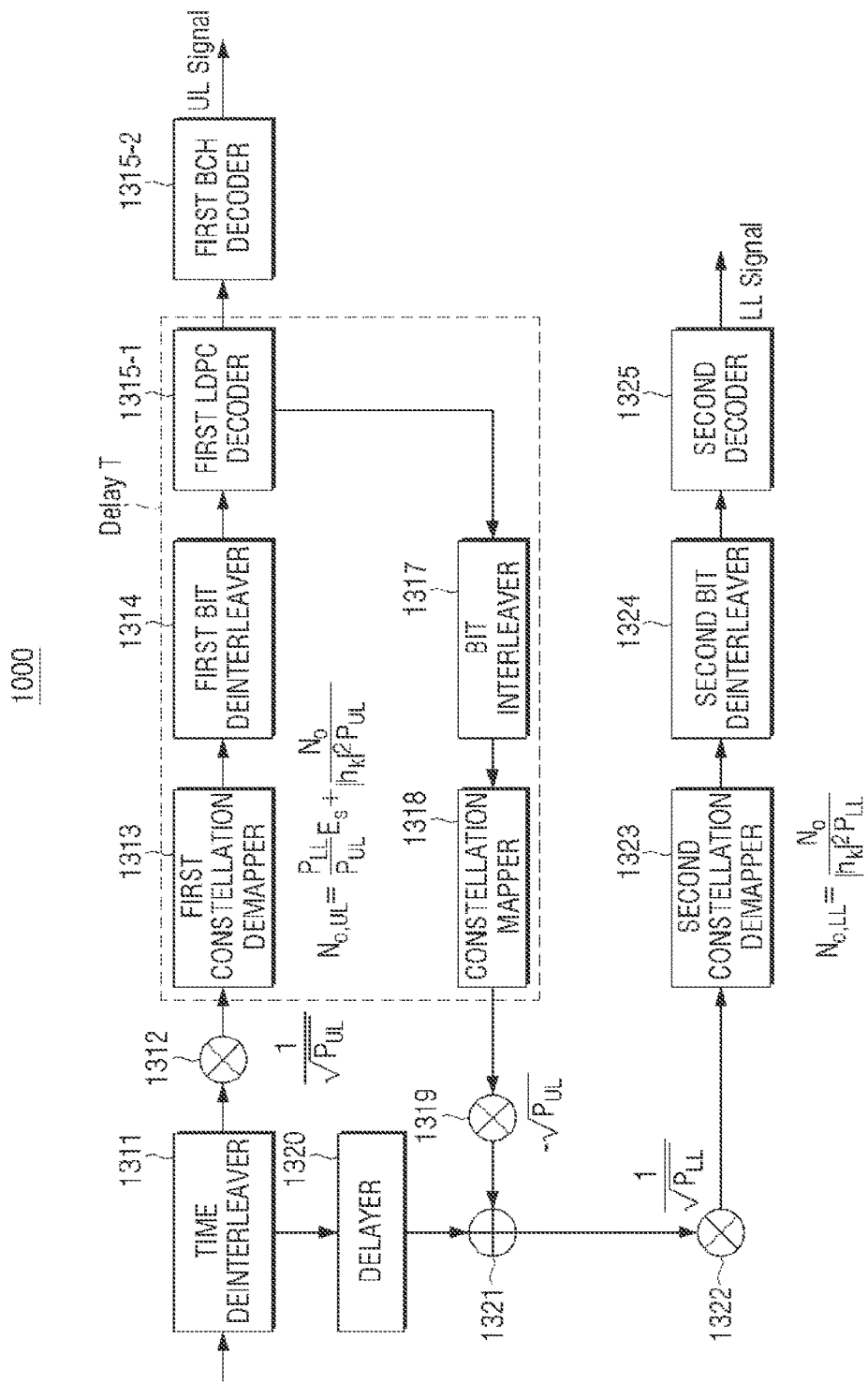
Figure 14:
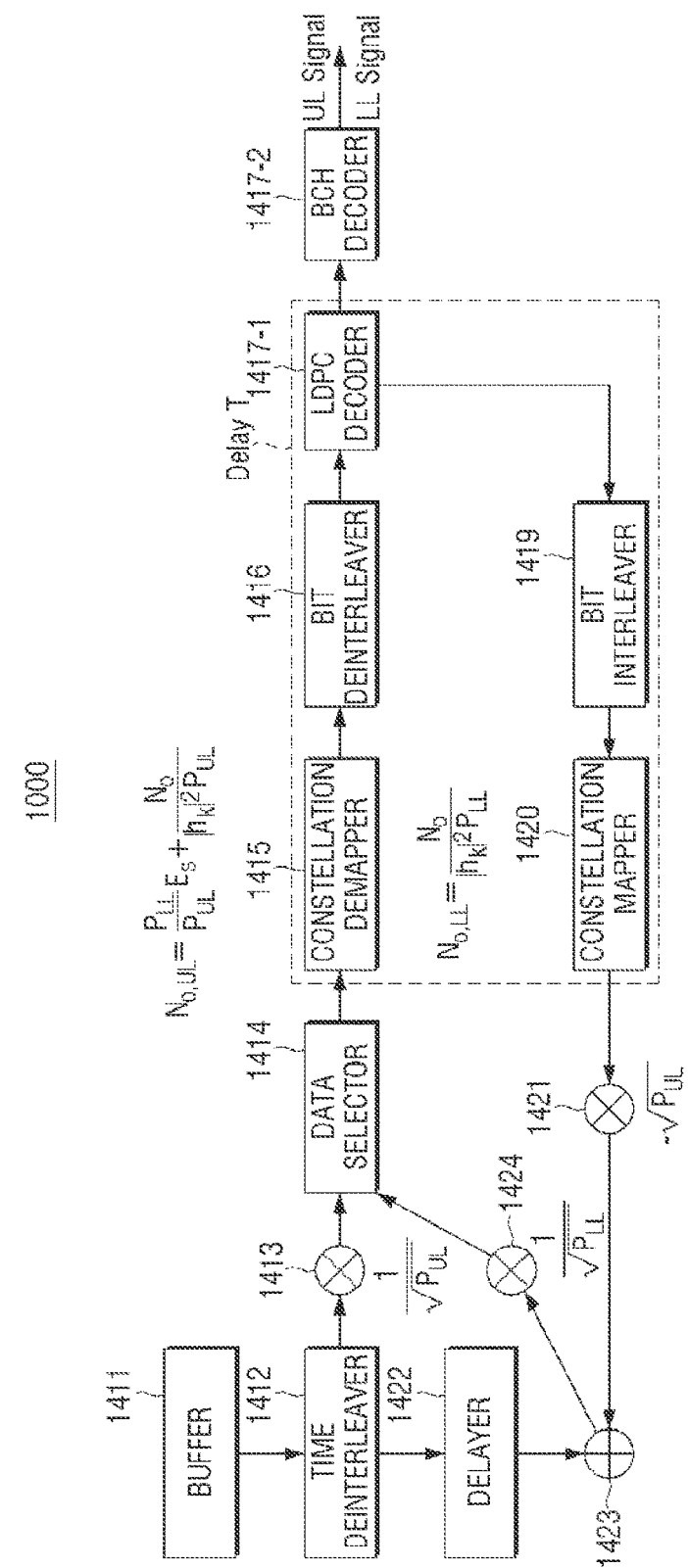

As one example, as illustrated in FIGS. 13 and 14, the signal corresponding to the first layer may be restored using the LDPC parity bits decoded by the first LDPC decoder without separately performing the LDPC encoding.

FIG. 13 is a block diagram illustrating a detailed configuration of a transmitting apparatus according to an exemplary embodiment.

Referring to FIG. 13, a transmitting apparatus 1000 may include a time deinterleaver 1311, a first gain controller 1312, a first constellation demapper 1313, a bit deinterleaver 1314, a first LDPC decoder 1315-1, a first BCH decoder 1315-2, a bit interleaver 1317, a constellation mapper 1318, a second gain controller 1319, a delayer 1320, an adder 1321, a third gain controller 1322, a second constellation demapper 1323, a second bit deinterleaver 1324, and a second decoder 1325.

Meanwhile, since the time deinterleaver 1311, the first gain controller 1312, the first constellation demapper 1313, the bit deinterleaver 1314, the first LDPC decoder 1315-1, the first BCH decoder 1315-2, the constellation mapper 1318, the second gain controller 1319, the delayer 1320, the adder 1321, the third gain controller 1322, the second constellation demapper 1323, the second bit deinterleaver 1324, and the second decoder 1325 illustrated in FIG. 13 perform the same operations as the time deinterleaver 1111, the first gain controller 1112, the first constellation demapper 1113, the bit deinterleaver 1114, the first LDPC decoder 1115-1, the first BCH decoder 1115-2, the constellation mapper 1118, the second gain controller 1119, the delayer 1120, the adder 1121, the third gain controller 1122, the second constellation demapper 1123, the second bit deinterleaver 1124, and the second decoder 1125 described in FIG. 11, a detailed description thereof will be omitted.

However, since a signal corresponding to the first layer is restored without separately performing LDPC encoding in FIG. 13, the delayer 1320 delays the signal output from the time deinterleaver 1311 as much as a time (Delay T) obtained by summing all times taken to perform a signal processing at the first constellation demapper 1313, the first bit deinterleaver 1314, the first LDPC decoder 1315, the bit interleaver 1317, and the constellation mapper 1318.

The bit interleaver 1317 may interleave the bits output from the first LDPC decoder 1315-1.

Specifically, the bit interleaver 1317 may interleave the LDPC codeword bits including the LDPC information word bits and the LDPC parity bits decoded by the first LDPC decoder 1315-1 using the same method as that performed by the first bit interleaver 112 of the transmitting apparatus 100, and may output the interleaved LDPC codeword bits to the constellation mapper 1318.

FIG. 14 is a block diagram illustrating a detailed configuration of a receiving apparatus according to an exemplary embodiment.

Referring to FIG. 14, a receiving apparatus 1000 may include a buffer 1411, a time deinterleaver 1412, a first gain controller 1413, a data selector 1414, a constellation demapper 1415, a bit deinterleaver 1416, an LDPC decoder 1417-1, a BCH decoder 1417-2, an LDPC encoder 1418, a bit interleaver 1419, a constellation mapper 1420, a second gain controller 1421, a delayer 1422, an adder 1423, and a third gain controller 1424.

Meanwhile, since the buffer 1411, the time deinterleaver 1412, the first gain controller 1413, the data selector 1414, the constellation demapper 1415, the bit deinterleaver 1416, the LDPC decoder 1417-1, the BCH decoder 1417-2, the constellation mapper 1420, the second gain controller 1421, the delayer 1422, the adder 1423, and the third gain controller 1424 illustrated in FIG. 14 perform the same operations as the buffer 1211, the time deinterleaver 1212, the first gain controller 1213, the data selector 1214, the constellation demapper 1215, the bit deinterleaver 1216, the LDPC decoder 1217-1, the BCH decoder 1217-2, the constellation mapper 1220, the second gain controller 1221, the delayer 1222, the adder 1223, and the third gain controller 1224 described in FIG. 12, a detailed description thereof will be omitted.

However, since a signal corresponding to the first layer is restored using the decoded bits without separately performing the LDPC encoding in FIG. 14, the delayer 1422 delays the signal output from the time deinterleaver 1412 as much as a time (Delay T) obtained by summing all times taken to perform a signal processing at the constellation demapper 1415, the bit deinterleaver 1416, the LDPC decoder 1417-1, the bit interleaver 1419, and the constellation mapper 1420.

The bit interleaver 1419 may interleave the bits output from the first LDPC decoder 1315-1.

Specifically, the bit interleaver 1419 may interleave the LDPC codeword bits including the LDPC information word bits and the LDPC parity bits decoded by the first LDPC decoder 1417-1 using the same method as that performed by the first bit interleaver 112 of the transmitting apparatus 100, and may output the interleaved LDPC codeword bits to the constellation mapper 1420.

As described above, according to the methods described in FIGS. 13 and 14, since the signal corresponding to the first layer is restored using the LDPC information word bits and the LDPC parity bits decoded from the first layer signal without separately performing the LDPC encoding, the time taken to restore the second layer signal may be shortened.

Figure 15:
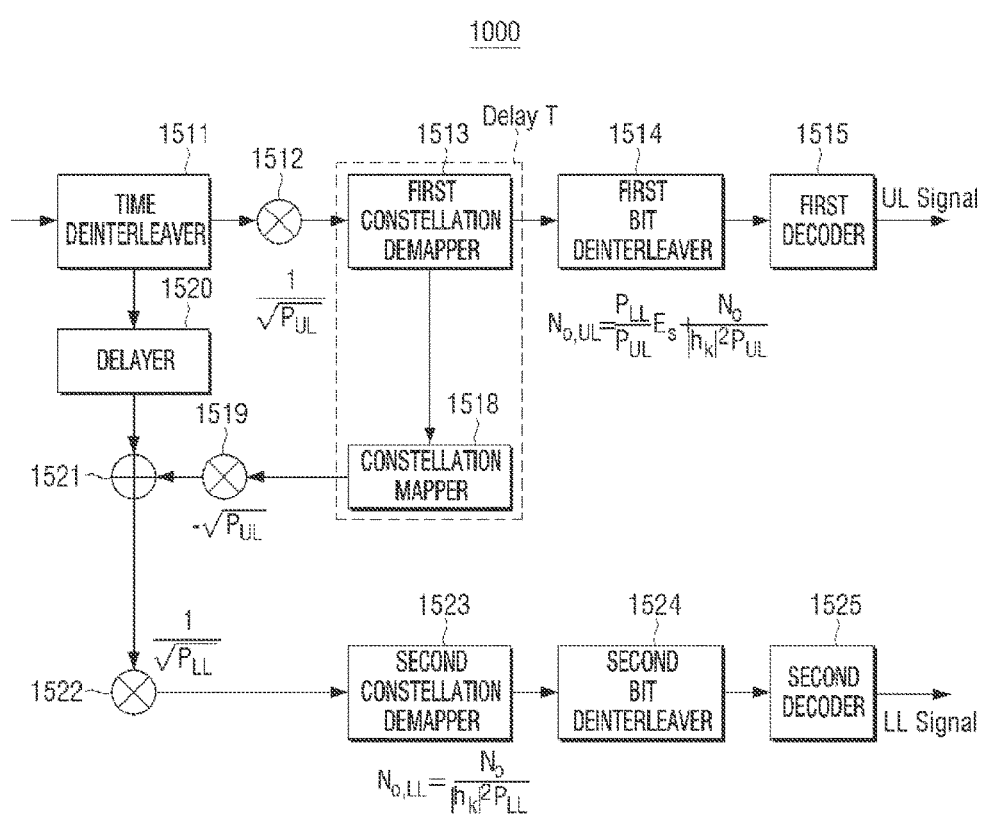
Figure 16:
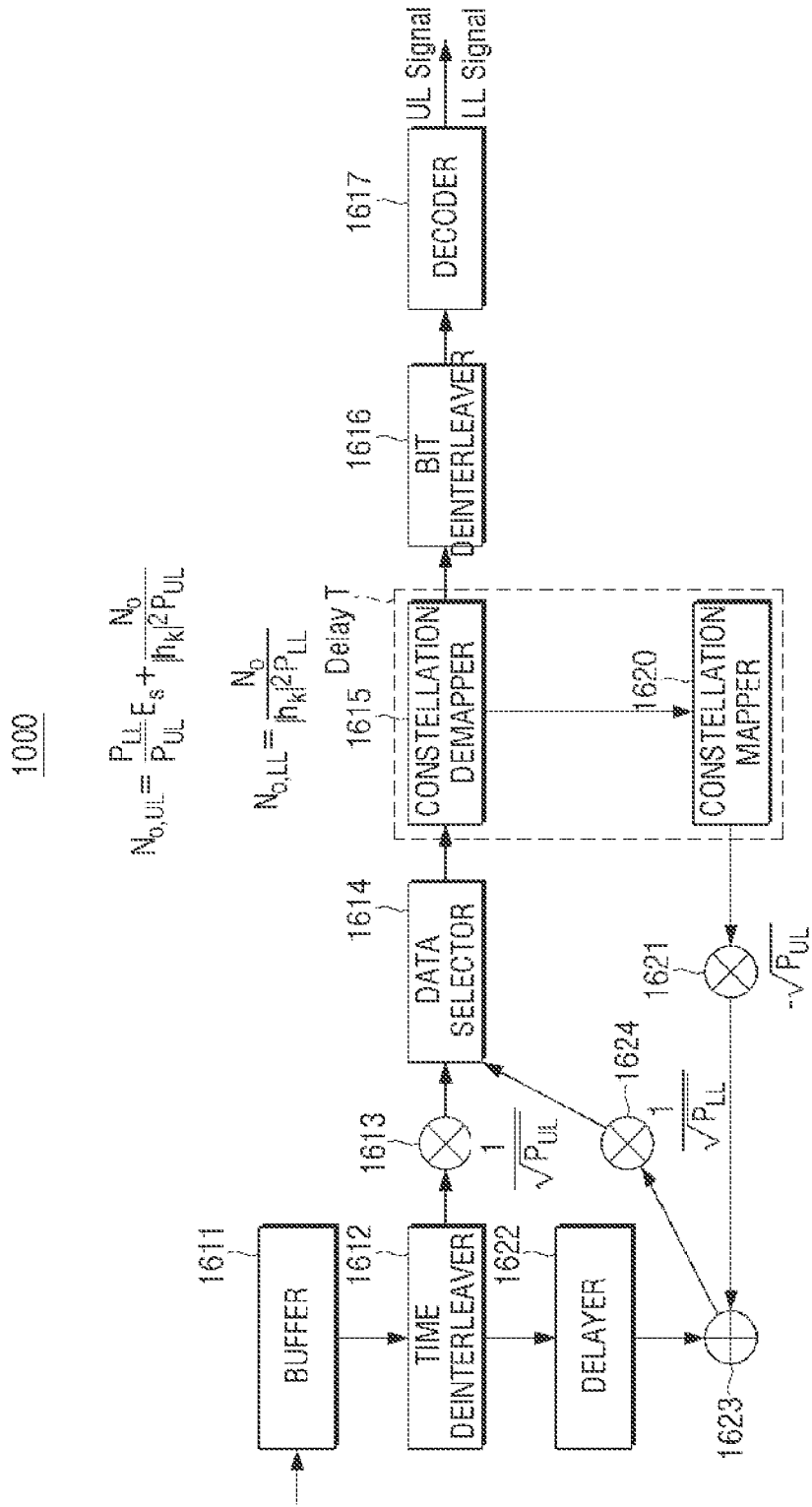

As another example, as illustrated in FIGS. 15 and 16, the signal corresponding to the first layer may be restored using the values demapped by the constellation demapper without separately performing the LDPC encoding.

FIG. 15 is a block diagram illustrating a detailed configuration of a receiving apparatus according to an exemplary embodiment.

Referring to FIG. 15, a receiving apparatus 1000 may include a time deinterleaver 1511, a first gain controller 1512, a first constellation demapper 1513, a bit deinterleaver 1514, a first decoder 1515, a constellation mapper 1518, a second gain controller 1519, a delayer 1520, an adder 1521, a third gain controller 1522, a second constellation demapper 1523, a second bit deinterleaver 1524, and a second decoder 1525.

Meanwhile, since the time deinterleaver 1511, the first gain controller 1512, the first constellation demapper 1513, the bit deinterleaver 1514, the first decoder 1515, the second gain controller 1519, the delayer 1520, the adder 1521, the third gain controller 1522, the second constellation demapper 1523, the second bit deinterleaver 1524, and the second decoder 1525 illustrated in FIG. 15 perform the same operations as the time deinterleaver 911, the first gain controller 912, the first constellation demapper 913, the bit deinterleaver 914, the first decoder 915, the second gain controller 919, the delayer 920, the adder 921, the third gain controller 922, the second constellation demapper 923, the second bit deinterleaver 924, and the second decoder 925 described in FIG. 9, a detailed description thereof will be omitted.

However, since a signal corresponding to the first layer is restored using the demapped values without separately performing the LDPC encoding in FIG. 11, the delayer 1520 delays the signal output from the time deinterleaver 1511 as much as a time (Delay T) obtained by summing all times taken to perform a signal processing at the first constellation demapper 1513, and the constellation mapper 1518.

The constellation mapper 1518 may modulate the values output from the first constellation demapper 1513 to be mapped to constellation points.

Specifically, the constellation mapper 1518 may modulate the values output from the first constellation mapper 1513 using the same method as that performed by the first constellation mapper 113 of the transmitting apparatus 100 to be mapped to the constellation points, and may output the signal corresponding to the constellation points to the second gain controller 1519.

FIG. 16 is a block diagram illustrating a detailed configuration of a receiving apparatus according to an exemplary embodiment.

Referring to FIG. 16, a receiving apparatus 1000 may include a buffer 1611, a time deinterleaver 1612, a first gain controller 1613, a data selector 1614, a constellation demapper 1615, a bit deinterleaver 1616, a decoder 1617, a constellation mapper 1620, a second gain controller 1621, a delayer 1622, an adder 1623, and a third gain controller 1624.

Meanwhile, since the buffer 1611, the time deinterleaver 1612, the first gain controller 1613, the data selector 1614, the constellation demapper 1615, the bit deinterleaver 1616, the decoder 1617, the second gain controller 1621, the delayer 1622, the adder 1623, and the third gain controller 1624 illustrated in FIG. 16 perform the same operations as the buffer 1011, the time deinterleaver 1012, the first gain controller 1013, the data selector 1014, the constellation demapper 1015, the bit deinterleaver 1016, the decoder 1017, the encoder 1018, the bit interleaver 1019, the second gain controller 1021, the delayer 1022, the adder 1023, and the third gain controller 1024 described in FIG. 10, a detailed description thereof will be omitted.

However, since a signal corresponding to the first layer is restored using the demapped values without separately performing the LDPC encoding in FIG. 16, the delayer 1622 delays the signal output from the time deinterleaver 1615 as much as a time (Delay T) obtained by summing all times taken to perform a signal processing at the first constellation demapper 1620, and the constellation mapper 1612.

The constellation mapper 1620 may modulate the values output from the first constellation demapper 1615 to be mapped to constellation points.

Specifically, the constellation mapper 1620 may modulate the values output from the first constellation mapper 1615 using the same method as that performed by the first constellation mapper 113 of the transmitting apparatus 100 to be mapped to the constellation points, and may output the signal corresponding to the constellation points to the second gain controller 1621.

As described above, according to the methods described in FIGS. 15 and 16, since the signal corresponding to the first layer is restored using the values demodulated from the first layer signal without separately performing the LDPC encoding, the time taken to restore the second layer signal may be shortened.

Meanwhile, $N_{o,UL}$ illustrated in FIGS. 9 to 16 denotes variance of noise included in the LDM signal when the bits transmitted through the first layer signal are restored from the LDM signal, and $N_{o,LL}$ denotes variance of noise included in the signal obtained by removing the first layer signal from the LDM signal when the bits transmitted through the second layer signal are restored from the LDM signal. Meanwhile, Es denotes power of the output signal of the constellation mapper before being scaled with $P_{UL}$ and $P_{LL}$, and $N_O$ denotes effective noise variance required when a current signal is detected from the constellation demapper.

Accordingly, the constellation demapper may remove the noise from the signal by assuming the values except for the signal and channel components as the noise variance, and may generate values corresponding to the bits transmitted through each of the layers.

Meanwhile, in the examples described above, the first layer signal is searched from the LDM signal to be demodulated, and the signal obtained by removing the signal corresponding to the first layer from the LDM signal, that is, the second layer signal is demodulated.

However, according to an exemplary embodiment, the first layer signal and the second layer signal may be demodulated at a time by searching for both the first layer signal and the second layer signal from the LDM signal, and in the case in which the first layer signal and the second layer signal are demodulated at a time using the above-mentioned full-search, a method for restoring the information word bits transmitted through each of the layers will be described in more detail.

Figure 17:
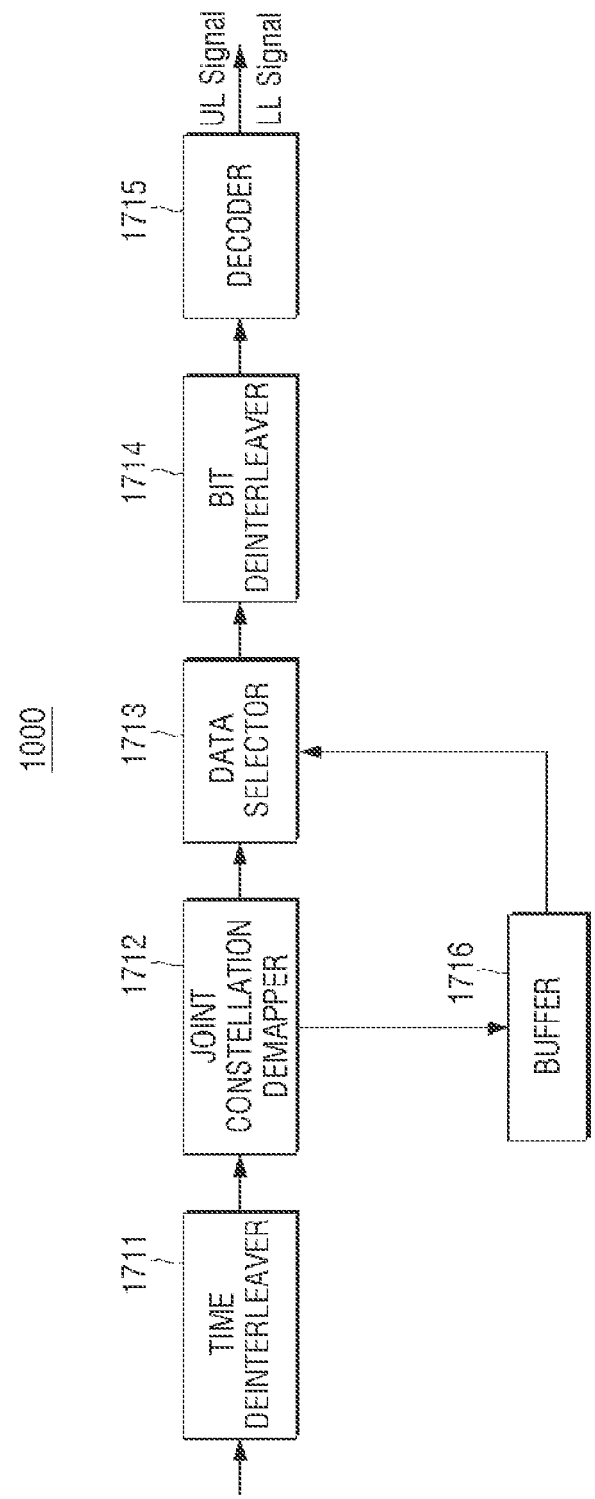

FIG. 17 is a block diagram illustrating a detailed configuration of a receiving apparatus according to an exemplary embodiment.

Referring to FIG. 17, a receiving apparatus 1000 may include a time deinterleaver 1711, a joint constellation demapper 1712, a data selector 1713, a bit deinterleaver 1714, a decoder 1715, and a buffer 1716.

The time deinterleaver 1711 deinterleaves cells demapped from a symbol of an OFDM frame.

Specifically, the time deinterleaver 1711, which is a configuration corresponding to the time interleaver 160 of the transmitting apparatus 100, may inversely perform the operation performed by the time interleaver 160. That is, the time deinterleaver 1711 may deinterleave the cells demapped from sub-carriers of the symbol, and may output the deinterleaved cells to the joint constellation demapper 1712 and the buffer 1713.

The joint constellation demapper 1712 may demodulate the signal output from the time deinterleaver 1711, to thereby generate values corresponding to bits transmitted through the first and second layers.

Specifically, the joint constellation demapper 1712 may perform a full-search for the signal output the time deinterleaver 1711 based on the modulation scheme performed by the first constellation mapper 113 and the second constellation mapper 123 of the transmitting apparatus 100 to search for constellation points corresponding to the first layer signal and the second layer signal, and may demodulate the constellation points to generate the values corresponding to bits transmitted through the first layer and the second layer.

Here, the value corresponding to the bits transmitted from the transmitting apparatus 100 is typically a value calculated based on possibility that the received bit is 0 and possibility that the received bit is 1, wherein each of the probabilities itself may be used as the value corresponding to each of the bits, and as another example, the value corresponding to the bits transmitted from the transmitting apparatus 100 may also be an LR or LLR value.

Specifically, the LR value means a ratio of the possibility that the bit transmitted from the transmitting apparatus 100 is 0 and the possibility that the bit transmitted from the transmitting apparatus 100 is 1, and the LLR value may be represented by a value obtained by taking Log to the ratio of the possibility that the bit transmitted from the transmitting apparatus 100 is 0 and the possibility that the bit transmitted from the transmitting apparatus 100 is 1.

Meanwhile, although the above-mentioned example describes the case in which the LR value or the LLR value is used, this is one example, and the received signal itself may also be used.

In addition, the joint constellation demapper 1712 may output the values corresponding to the bits transmitted through the first layer to the data selector 1713, and may output the values corresponding to the bits transmitted through the second layer to the buffer 1716.

The data selector 1713 may receive the signals output from the joint constellation demapper 1712 and the buffer 1716, and may select one of the signals to be output.

Specifically, in the case in which the first layer signal is decoded, the data selector 1713 may output the signal received from the joint constellation demapper 1712 to the bit deinterleaver 1714.

The bit deinterleaver 1714 may deinterleave the signal output from the data selector 1713.

Specifically, in the case in which the first layer signal is decoded, the bit deinterleaver 1714 may inversely perform the operation performed by the first bit interleaver 112 of the transmitting apparatus 100, to thereby deinterleave the value corresponding to the bits and to output the deinterleaved values to the decoder 1715.

The decoder 1715 may restore information word bits transmitted through the first layer using the values output from the bit deinterleaver 1714.

To this end, the decoder 1715 may include an LDPC decoder (not shown) and a BCH decoder (not shown).

Specifically, the LDPC decoder (not shown) may perform LDPC decoding using the values output from the bit deinterleaver 1714 using a method corresponding to the LDPC encoding performed by the LDPC encoder (not shown) of the first encoder 111 of the transmitting apparatus 100. That is, the LDPC decoder (not shown) may perform the LDPC decoding using the values output from the bit deinterleaver 1714 based on the parity check matrix used when the LDPC encoder (not shown) of the first encoder 111 performs the LDPC encoding, to thereby restore LDPC information word bits and LDPC parity bits from the first layer signal.

In addition, the BCH decoder (not shown) may perform BCH decoding on the LDPC information word bits restored by the LDPC decoder (not shown) using a method corresponding to the BCH encoding performed by the BCH encoder (not shown) of the first encoder 111 of the transmitting apparatus 100, to thereby restore the information word bits transmitted through the first layer.

Through the above-mentioned operations, the receiving apparatus 1000 may receive the information word bits transmitted through the first layer signal.

The buffer 1716 may store the signal output from the joint constellation demapper 1712, and may output the stored signal to the data selector 1713 when the decoding of the first layer signal is completed.

Specifically, the buffer 1716 may receive and store the values corresponding to the second layer signal generated based on the cells demapped from the k-th sub-carrier of the symbol of the OFDM frame from the joint constellation demapper 1712, and may output the values corresponding to the second layer signal generated based on the cells demapped from the k-th sub-carrier to the data selector 1713 when the decoding for the first layer signal transmitted through the k-th sub-carrier is completed and the restoration for the information word bits transmitted through the first layer is completed.

The data selector 1713 may receive the signals output from the joint constellation demapper 1712 and the buffer 1716, and may select one of the signals to be output.

Specifically, in the case in which the second layer signal is to be decoded, the data selector 1713 may output the signal received from the joint constellation demapper 1716 to the bit deinterleaver 1714.

The bit deinterleaver 1714 may deinterleave the signal output from the data selector 1713.

Specifically, in the case in which the second layer signal is to be decoded, the bit deinterleaver 1714 may inversely perform the operation performed by the second bit interleaver 122 of the transmitting apparatus 100, to thereby deinterleave the value corresponding to the bits and to output the deinterleaved values to the decoder 1715.

The decoder 1715 may restore information word bits transmitted through the second layer using the values output from the bit deinterleaver 1714.

To this end, the decoder 1715 may include an LDPC decoder (not shown) and a BCH decoder (not shown).

Specifically, the LDPC decoder (not shown) may perform LDPC decoding using the values output from the bit deinterleaver 1714 using a method corresponding to the LDPC encoding performed by the LDPC encoder (not shown) of the second encoder 121 of the transmitting apparatus 100. That is, the LDPC decoder (not shown) may perform the LDPC decoding using the values output from the bit deinterleaver 1714 based on the parity check matrix used when the LDPC encoder (not shown) of the second encoder 121 performs the LDPC encoding, to thereby restored LDPC information word bits and LDPC parity bits from the second layer signal.

In addition, the BCH decoder (not shown) may perform BCH decoding on the LDPC information word bits restored by the LDPC decoder (not shown) using a method corresponding to the BCH encoding performed by the BCH encoder (not shown) of the second encoder 121 of the transmitting apparatus 100, to thereby restore the information word bits transmitted through the second layer.

Through the above-mentioned operations, the receiving apparatus 1000 may receive the information word bits transmitted through the second layer signal.

Figure 18:
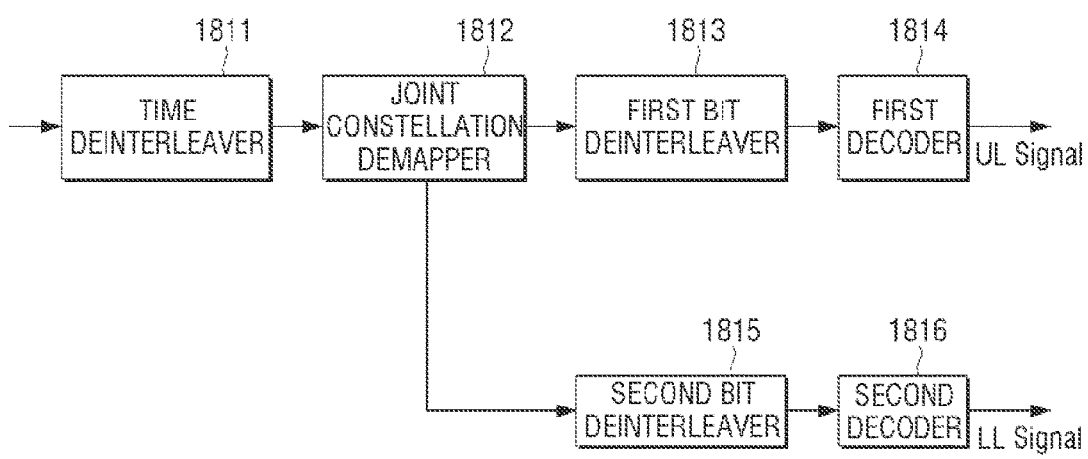

FIG. 18 is a block diagram illustrating a detailed configuration of a receiving apparatus according to an exemplary embodiment.

Referring to FIG. 18, a receiving apparatus 1000 may include a time deinterleaver 1811, a joint constellation demapper 1812, a first bit deinterleaver 1813, a first decoder 1814, a second bit deinterleaver 1815, and a second decoder 1816.

The time deinterleaver 1811 deinterleaves cells demapped from a symbol of an OFDM frame.

Specifically, the time deinterleaver 1811, which is a configuration corresponding to the time interleaver 160 of the transmitting apparatus 100, may inversely perform the operation performed by the time interleaver 160. That is, the time deinterleaver 1811 may deinterleave the cells demapped from sub-carriers of the symbol, and may output the deinterleaved cells to the joint constellation demapper 1812.

The joint constellation demapper 1812 may demodulate the signal output from the time deinterleaver 1811, to thereby generate values corresponding to the bits transmitted through the first and second layers.

Specifically, the joint constellation demapper 1812 may perform a full-search for a signal output the time deinterleaver 1811 based on the modulation scheme performed by the first constellation mapper 113 and the second constellation mapper 123 of the transmitting apparatus 100 to search for constellation points corresponding to the first layer signal and the second layer signal, and may demodulate the constellation points to generate the values corresponding to bits transmitted through the first layer and the second layer.

In addition, the joint constellation demapper 1812 may output the values corresponding to the bits transmitted through the first layer to the first bit deinterleaver 1813, and may output the values corresponding to the bits transmitted through the second layer to the second bit deinterleaver 1815.

The first bit deinterleaver 1813 may deinterleave the signal output from the joint constellation demapper 1812.

Specifically, the first bit deinterleaver 1813 may inversely perform the operation performed by the first bit interleaver 112 of the transmitting apparatus 100, to thereby deinterleave the value corresponding to the bits and to output the deinterleaved values to the first decoder 1814.

The first decoder 1814 may restore information word bits transmitted through the first layer using the values output from the first bit deinterleaver 1813.

To this end, the first decoder 1814 may include a first LDPC decoder (not shown) and a first BCH decoder (not shown).

Specifically, the first LDPC decoder (not shown) may perform LDPC decoding using the values output from the first bit deinterleaver 1813 using a method corresponding to the LDPC encoding performed by the LDPC encoder (not shown) of the first encoder 111 of the transmitting apparatus 100. That is, the first LDPC decoder (not shown) may perform the LDPC decoding using the values output from the first bit deinterleaver 1813 based on the parity check matrix used when the LDPC encoder (not shown) of the first encoder 111 performs the LDPC encoding, to thereby restore LDPC information word bits and LDPC parity bits from the first layer signal.

In addition, the first BCH decoder (not shown) may perform BCH decoding on the LDPC information word bits decoded by the first LDPC decoder (not shown) using a method corresponding to the BCH encoding performed by the BCH encoder (not shown) of the first encoder 111 of the transmitting apparatus 100, to thereby restore the information word bits transmitted through the first layer.

Through the above-mentioned operations, the receiving apparatus 1000 may receive the information word bits transmitted through the first layer signal.

The second bit deinterleaver 1815 may deinterleave the signal output from the joint constellation demapper 1812.

Specifically, the second bit deinterleaver 1815 may inversely perform the operation performed by the second bit interleaver 122 of the transmitting apparatus 100, to thereby deinterleave the value corresponding to the bits and to output the deinterleaved values to the second decoder 1816.

The second decoder 1816 may restore information word bits transmitted through the second layer using the values output from the second bit deinterleaver 1815.

To this end, the second decoder 1816 may include a second LDPC decoder (not shown) and a second BCH decoder (not shown).

Specifically, the second LDPC decoder (not shown) may perform LDPC decoding using the values output from the second bit deinterleaver 1815 using a method corresponding to the LDPC encoding performed by the LDPC encoder (not shown) of the second encoder 121 of the transmitting apparatus 100. That is, the LDPC decoder (not shown) may perform the LDPC decoding using the values output from the second bit deinterleaver 1815 based on the parity check matrix used when the LDPC encoder (not shown) of the second encoder 121 performs the LDPC encoding, to thereby restore LDPC information word bits and LDPC parity bits from the second layer signal.

In addition, the second BCH decoder (not shown) may perform BCH decoding on the LDPC information word bits decoded by the second LDPC decoder (not shown) using a method corresponding to the BCH encoding performed by the BCH encoder (not shown) of the second encoder 121 of the transmitting apparatus 100, to thereby restore the information word bits transmitted through the second layer.

Through the above-mentioned operations, the receiving apparatus 1000 may receive the information word bits transmitted through the second layer signal.

Figure 19:
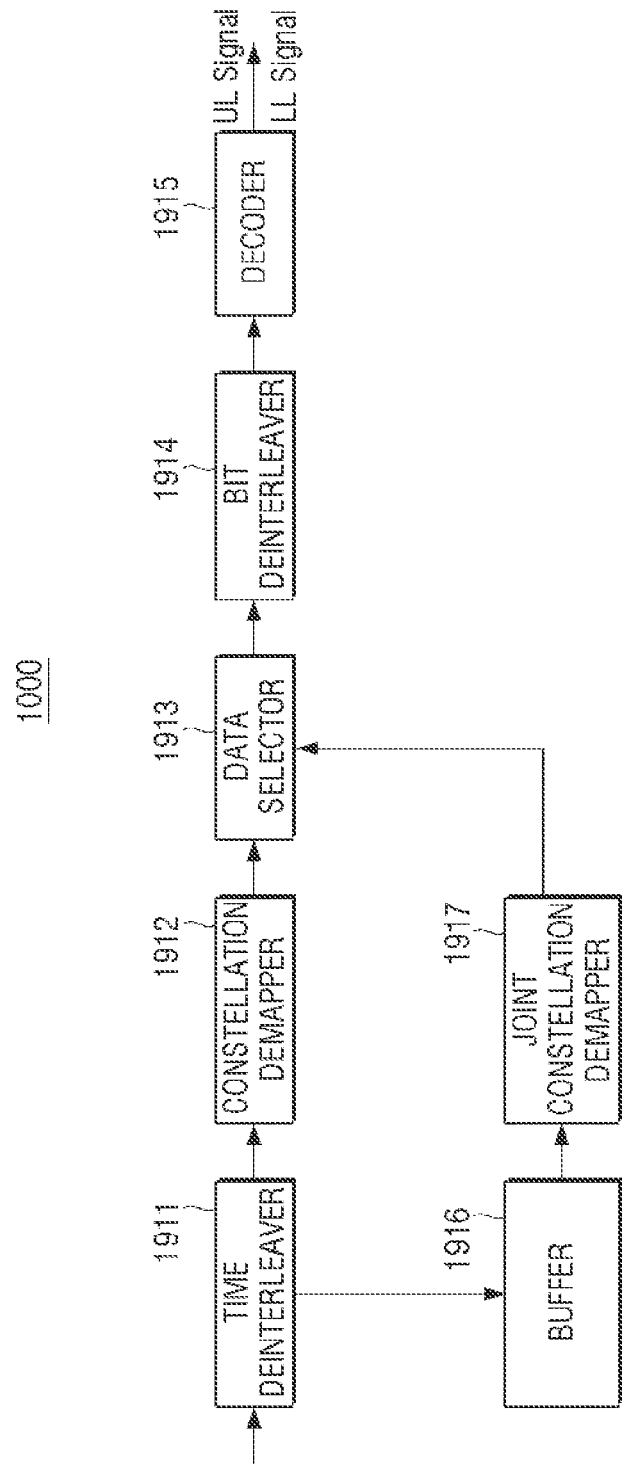

FIG. 19 is a block diagram illustrating a detailed configuration of a receiving apparatus according to an exemplary embodiment.

Referring to FIG. 19, a receiving apparatus 1000 may include a time deinterleaver 1911, a constellation demapper 1912, a data selector 1913, a bit deinterleaver 1914, a decoder 1915, a buffer 1916, and a joint constellation demapper 1917.

The time deinterleaver 1911 deinterleaves cells demapped from a symbol of an OFDM frame.

Specifically, the time deinterleaver 1911, which is a configuration corresponding to the time interleaver 160 of the transmitting apparatus 100, may inversely perform the operation performed by the time interleaver 160. That is, the time deinterleaver 1911 may deinterleave the cells demapped from sub-carriers of the symbol, and may output the deinterleaved cells to the constellation demapper 1912 and the buffer 1913.

The constellation demapper 1912 may demodulate the signal output from the time deinterleaver 1911, to thereby generate values corresponding to the bits transmitted through the first layer.

Specifically, the constellation demapper 1912 may demodulate the signal output from the time deinterleaver 1911 based on the modulation scheme performed by the first constellation mapper 113 of the transmitting apparatus 100 to generate the values corresponding to the bits transmitted through the first layer, and may output the values to the data selector 1913.

The data selector 1913 may receive the signals output from the constellation demapper 1912 and the joint constellation demapper 1917, and may select one of the signals to be output.

Specifically, in the case in which the first layer signal is to be decoded, the data selector 1913 may output the signal received from the constellation demapper 1912 to the bit deinterleaver 1914.

The bit deinterleaver 1914 may deinterleave the signal output from the data selector 1913.

Specifically, in the case in which the first layer signal is to be decoded, the bit deinterleaver 1914 may inversely perform the operation performed by the first bit interleaver 112 of the transmitting apparatus 100, to thereby deinterleave the value corresponding to the bits and to output the deinterleaved values to the decoder 1915.

The decoder 1915 may restore information word bits transmitted through the first layer using the values output from the bit deinterleaver 1914.

To this end, the decoder 1915 may include an LDPC decoder (not shown) and a BCH decoder (not shown).

Specifically, the LDPC decoder (not shown) may perform LDPC decoding using the values output from the bit deinterleaver 1914 using a method corresponding to the LDPC encoding performed by the LDPC encoder (not shown) of the first encoder 111 of the transmitting apparatus 100. That is, the LDPC decoder (not shown) may perform the LDPC decoding using the values output from the bit deinterleaver 1914 based on the parity check matrix used when the LDPC encoder (not shown) of the first encoder 111 performs the LDPC encoding, to thereby restore LDPC information word bits and LDPC parity bits from the first layer signal.

In addition, the BCH decoder (not shown) may perform BCH decoding on the LDPC information word bits decoded by the LDPC decoder (not shown) using a method corresponding to the BCH encoding performed by the BCH encoder (not shown) of the first encoder 111 of the transmitting apparatus 100, to thereby restore the information word bits transmitted through the first layer.

Through the above-mentioned operations, the receiving apparatus 1000 may receive the information word bits transmitted through the first layer signal.

The buffer 1916 may store the signal output from the time deinterleaver 1911, and may output the stored signal to the joint constellation demapper 1917 when the decoding for the first layer signal is completed.

Specifically, the buffer 1916 may receive and store the cells demapped from the k-th sub-carrier of the symbol of the OFDM frame from the time deinterleaver 1911, and may output the cells demapped from the k-th sub-carrier to the data selector 1913 when the decoding for the first layer signal transmitted through the k-th sub-carrier is completed and the restoration for the information word bits transmitted through the first layer is completed.

The joint constellation demapper 1917 may demodulate the signal output from the buffer 1916, to thereby generate values corresponding to the bits transmitted through the second layer.

Specifically, the joint constellation demapper 1917 may perform a full-search for the signal output the buffer 1916 based on the modulation scheme performed by the first constellation mapper 113 and the second constellation mapper 123 of the transmitting apparatus 100 to search for constellation points corresponding to the first layer signal and the second layer signal, and may demodulate the constellation points corresponding to the second layer signal to generate the values corresponding to the bits transmitted through the second layer.

In addition, the joint constellation demapper 1917 may output the values corresponding to the bits transmitted through the second layer to the data selector 1913.

The data selector 1913 may receive the signals output from the joint constellation demapper 1912 and the buffer 1917, and may select one of the signals to be output.

Specifically, in the case in which the second layer signal is to be decoded, the data selector 1913 may output the signal received from the joint constellation demapper 1917 to the bit deinterleaver 1914.

The bit deinterleaver 1914 may deinterleave the signal output from the data selector 1913.

Specifically, in the case in which the second layer signal is to be decoded, the bit deinterleaver 1914 may inversely perform the operation performed by the second bit interleaver 122 of the transmitting apparatus 100, to thereby deinterleave the value corresponding to the bits and to output the deinterleaved values to the decoder 1915.

The decoder 1915 may restore information word bits transmitted through the second layer using the values output from the bit deinterleaver 1914.

To this end, the decoder 1915 may include an LDPC decoder (not shown) and a BCH decoder (not shown).

Specifically, the LDPC decoder (not shown) may perform LDPC decoding using the values output from the bit deinterleaver 1914 using a method corresponding to the LDPC encoding performed by the LDPC encoder (not shown) of the second encoder 121 of the transmitting apparatus 100. That is, the LDPC decoder (not shown) may perform the LDPC decoding using the values output from the bit deinterleaver 1914 based on the parity check matrix used when the LDPC encoder (not shown) of the second encoder 121 performs the LDPC encoding, to thereby restore LDPC information word bits and LDPC parity bits from the second layer signal.

In addition, the BCH decoder (not shown) may perform BCH decoding on the LDPC information word bits decoded by the LDPC decoder (not shown) using a method corresponding to the BCH encoding performed by the BCH encoder (not shown) of the second encoder 121 of the transmitting apparatus 100, to thereby restore the information word bits transmitted through the second layer.

Through the above-mentioned operations, the receiving apparatus 1000 may receive the information word bits transmitted through the second layer signal.

Figure 20:
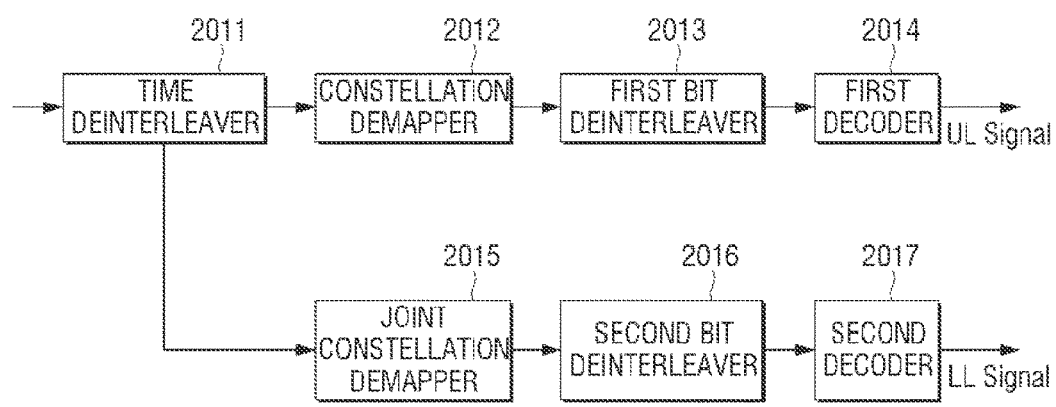

FIG. 20 is a block diagram illustrating a detailed configuration of a receiving apparatus according to an exemplary embodiment.

Referring to FIG. 20, a receiving apparatus 1000 may include a time deinterleaver 2011, a constellation demapper 2012, a first bit deinterleaver 2013, a first decoder 2014, a joint constellation demapper 2015, a second bit deinterleaver 2016, and a second decoder 2017.

The time deinterleaver 2011 deinterleaves cells demapped from a symbol of an OFDM frame.

Specifically, the time deinterleaver 2011, which is a configuration corresponding to the time interleaver 160 of the transmitting apparatus 100, may inversely perform the operation performed by the time interleaver 160. That is, the time deinterleaver 2011 may deinterleave the cells demapped from the sub-carrier of the symbol, and may output the deinterleaved cells to the constellation demapper 2012 and the joint constellation demapper 2015.

The constellation demapper 2012 may demodulate the signal output from the time deinterleaver 2011, to thereby generate values corresponding to the bits transmitted through the first layer.

Specifically, the constellation demapper 2012 may demodulate the signal output from the time deinterleaver 2011 based on the modulation scheme performed by the first constellation mapper 113 of the transmitting apparatus 100 to generate the values corresponding to the bits transmitted through the first layer, and may output the values to the first bit deinterleaver 2013.

The first bit deinterleaver 2013 may deinterleave the signal output from the constellation demapper 2012.

Specifically, the first bit deinterleaver 2013 may inversely perform the operation performed by the first bit interleaver 112 of the transmitting apparatus 100, to thereby deinterleave the value corresponding to the bits and to output the deinterleaved values to the first decoder 2014.

The first decoder 2014 may restore information word bits transmitted through the first layer using the values output from the first bit deinterleaver 2013.

To this end, the first decoder 2014 may include a first LDPC decoder (not shown) and a first BCH decoder (not shown).

Specifically, the first LDPC decoder (not shown) may perform LDPC decoding using the values output from the first bit deinterleaver 2013 using a method corresponding to the LDPC encoding performed by the LDPC encoder (not shown) of the first encoder 111 of the transmitting apparatus 100. That is, the first LDPC decoder (not shown) may perform the LDPC decoding using the values output from the first bit deinterleaver 2013 based on the parity check matrix used when the LDPC encoder (not shown) of the first encoder 111 performs the LDPC encoding, to thereby restore LDPC information word bits and LDPC parity bits from the first layer signal.

In addition, the first BCH decoder (not shown) may perform BCH decoding on the LDPC information word bits decoded by the first LDPC decoder (not shown) using a method corresponding to the BCH encoding performed by the BCH encoder (not shown) of the first encoder 111 of the transmitting apparatus 100, to thereby restore the information word bits transmitted through the first layer.

Through the above-mentioned operations, the receiving apparatus 1000 may receive the information word bits transmitted through the first layer signal.

The joint constellation demapper 2015 may demodulate the signal output from the time deinterleaver 2011, to thereby generate values corresponding to the bits transmitted through the second layer.

Specifically, the joint constellation demapper 2015 may perform a full-search for the signal output the time deinterleaver 2011 based on the modulation scheme performed by the first constellation mapper 113 and the second constellation mapper 123 of the transmitting apparatus 100 to search for constellation points corresponding to the first layer signal and the second layer signal, and may demodulate the constellation points corresponding to the second layer signal to generate the values corresponding to the bits transmitted through the second layer.

In addition, the joint constellation demapper 2015 may output the values corresponding to the bits transmitted through the layer to the second bit deinterleaver 2016.

The second bit deinterleaver 2016 may deinterleave the signal output from the joint constellation demapper 2015.

Specifically, the second bit deinterleaver 2016 may inversely perform the operation performed by the second bit interleaver 122 of the transmitting apparatus 100, to thereby deinterleave the value corresponding to the bits and to output the deinterleaved values to the second decoder 2017.

The second decoder 2017 may restore information word bits transmitted through the second layer using the values output from the second bit deinterleaver 2016.

To this end, the second decoder 2017 may include a second LDPC decoder (not shown) and a second BCH decoder (not shown).

Specifically, the second LDPC decoder (not shown) may perform LDPC decoding using the values output from the second bit deinterleaver 2016 using a method corresponding to the LDPC encoding performed by the LDPC encoder (not shown) of the second encoder 121 of the transmitting apparatus 100. That is, the second LDPC decoder (not shown) may perform the LDPC decoding using the values output from the second bit deinterleaver 2016 based on the parity check matrix used when the LDPC encoder (not shown) of the second encoder 121 performs the LDPC encoding, to thereby restore LDPC information word bits and LDPC parity bits from the second layer signal.

In addition, the second BCH decoder (not shown) may perform the BCH decoding for the LDPC information word bits decoded by the second LDPC decoder (not shown) using a method corresponding to the BCH encoding performed by the BCH encoder (not shown) of the second encoder 121 of the transmitting apparatus 100, to thereby restore the information word bits transmitted through the second layer.

Through the above-mentioned operations, the receiving apparatus 1000 may receive the information word bits transmitted through the second layer signal.

Figure 21:
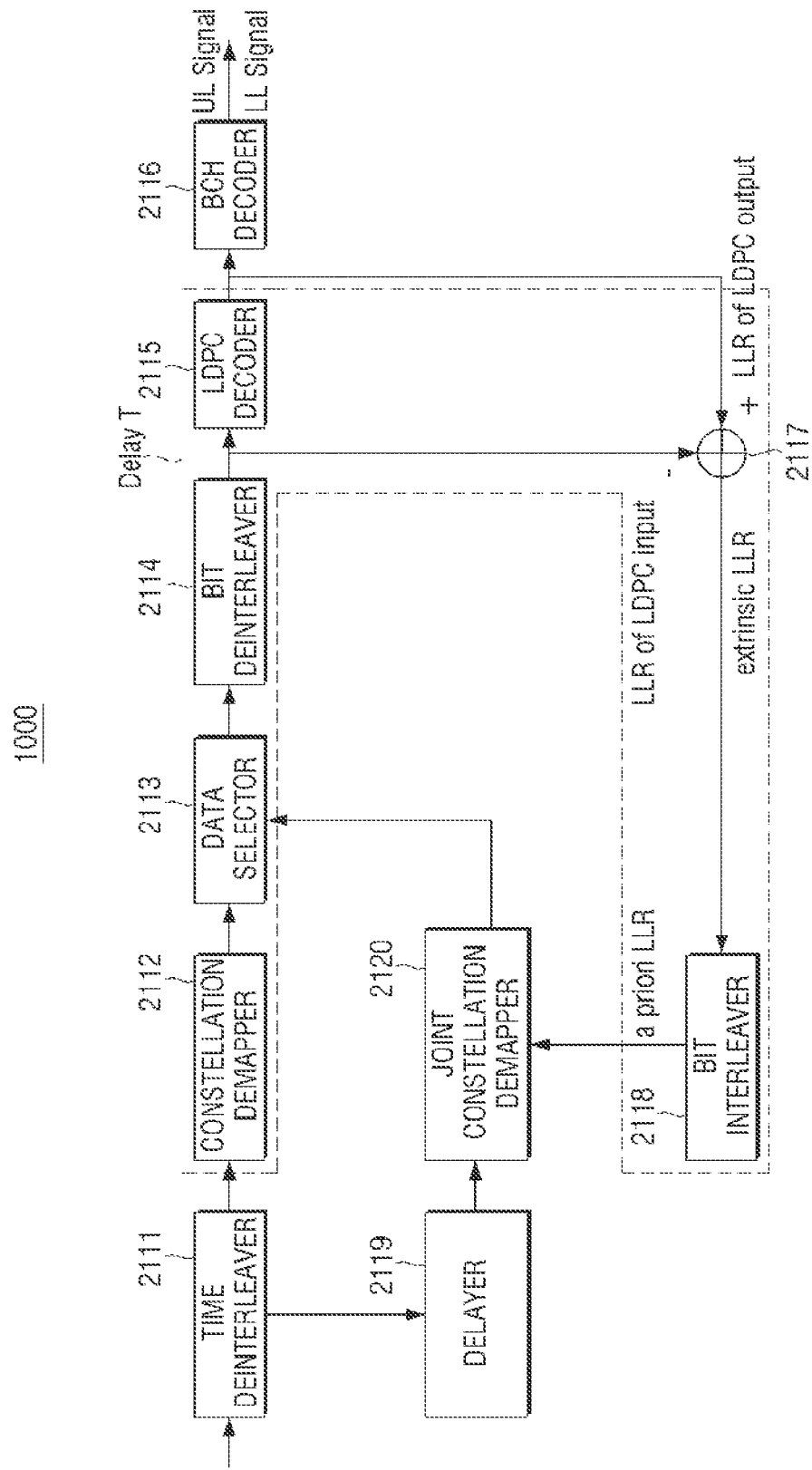

FIG. 21 is a block diagram illustrating a detailed configuration of a receiving apparatus according to an exemplary embodiment.

Referring to FIG. 21, a receiving apparatus 1000 may include a time deinterleaver 2111, a constellation demapper 2112, a data selector 2113, a bit deinterleaver 2114, an LDPC decoder 2115, a BCH decoder 2116, an LLR coupler 2117, a bit interleaver 2118, a delayer 2119, and a joint constellation demapper 2120.

The time deinterleaver 2111 deinterleaves cells demapped from a symbol of an OFDM frame.

Specifically, the time deinterleaver 2111, which is a configuration corresponding to the time interleaver 160 of the transmitting apparatus 100, may inversely perform the operation performed by the time interleaver 160. That is, the time deinterleaver 2111 may deinterleave the cells demapped from sub-carriers of the symbol, and may output the deinterleaved cells to the constellation demapper 2112 and the delayer 2119.

The constellation demapper 2112 may demodulate the signal output from the time deinterleaver 2111, to thereby generate values corresponding to the bits transmitted through the first layer.

Specifically, the constellation demapper 2112 may demodulate the signal output from the time deinterleaver 2111 based on the modulation scheme performed by the first constellation mapper 113 of the transmitting apparatus 100 to generate the values corresponding to the bits transmitted through the first layer, and may output the values to the data selector 2113.

The data selector 2113 may receive the signals output from the constellation demapper 2112 and the joint constellation demapper 2120, and may select one of the signals to be output.

Specifically, in the case in which the first layer signal is to be decoded, the data selector 2113 may output the signal received from the constellation demapper 2112 to the bit deinterleaver 2114.

The bit deinterleaver 2114 may deinterleave the signal output from the data selector 2113.

Specifically, in the case in which the first layer signal is to be decoded, the bit deinterleaver 2114 may inversely perform the operation performed by the bit interleaver 112 of the transmitting apparatus 100, to thereby deinterleave the value corresponding to the bits and to output the deinterleaved values to the LDPC decoder 2115.

The LDPC decoder 2115 may restore information word bits transmitted through the first layer using the values output from the bit deinterleaver 2114.

Specifically, in the case in which the first layer signal is decoded, the LDPC decoder 2115 may perform LDPC decoding using the values output from the bit deinterleaver 2114 using a method corresponding to the LDPC encoding performed by the LDPC encoder (not shown) of the first encoder 111 of the transmitting apparatus 100. That is, the LDPC decoder 2115 may perform the LDPC decoding using the values output from the bit deinterleaver 2114 based on the parity check matrix used when the LDPC encoder (not shown) of the first encoder 111 performs the LDPC encoding, to thereby restore LDPC information word bits and LDPC parity bits from the first layer signal.

In addition, in the case in which the first layer signal is decoded, the BCH decoder 2116 may perform BCH decoding on the LDPC information word bits decoded by the LDPC decoder 2115 using a method corresponding to the BCH encoding performed by the BCH encoder (not shown) of the first encoder 111 of the transmitting apparatus 100, to thereby restore the information word bits transmitted through the first layer.

Through the above-mentioned operations, the receiving apparatus 1000 may receive the information word bits transmitted through the first layer signal.

The LLR coupler 2117 may sum LLR values, and may output the summed LLR values to the bit interleaver 2118.

Specifically, the bit deinterleaver 2114 may deinterleave the values corresponding to the bits transmitted through the first layer, that is, the LLR values to output the deinterleaved values to the LLR coupler 2117. In addition, the LDPC decoder 2115 may update the LLR values received from the bit deinterleaver 2114 using a message passing operation, and may decide the bit value as 0 or 1 based on the updated LLR values to decode the LDPC information word bits and the LDPC parity bits from the first layer signal, wherein the updated LLR values may be output to the LLR coupler 2117.

Accordingly, the LLR coupler 2117 may couple the LLR values received from the bit deinterleaver 2114 and the LLR values received from the LDPC decoder 2115, and may output the coupled LLR values to the bit interleaver 2118.

Specifically, the LLR coupler 2117 may subtract the LLR values received from the bit deinterleaver 2114 from the LLR values received from the LDPC decoder 2115, and may then output the value (i.e., extrinsic LLR=LLR of LDPC decoder output−LLR of LDPC decoder input) to the bit interleaver 2118.

The bit interleaver 2118 may interleave the values output from the LLR coupler 2117.

Specifically, the bit interleaver 2118 may interleave the values output from the LLR coupler 2117 with the same system as that performed by the first bit interleaver 112 of the transmitting apparatus 100, and may output the interleaved values to the joint constellation mapper 2120.

The delayer 2119 may delay the signal output from the time deinterleaver 2111 to output the delayed signal.

Specifically, the delayer 2119 may delay the signal output from the time deinterleaver 2112 as much as a time (Delay T) obtained by summing all times taken to perform a signal processing at the constellation demapper 2112, the data selector 2113, the bit deinterleaver 2114, the LDPC decoder 2115, the LLR coupler 2117, and the bit interleaver 2118 to output the delayed signal to the joint constellation demapper 2120.

The joint constellation demapper 2120 may demodulate the signal output from the delayer 2119, to thereby generate values corresponding to the bits transmitted through the second layer.

Specifically, the joint constellation demapper 2120 may perform a full-search for the signal output the delayer 2119 based on the modulation scheme performed by the first constellation mapper 113 and the second constellation mapper 123 of the transmitting apparatus 100 to search for constellation points corresponding to the first layer signal and the second layer signal, and may demodulate the constellation points corresponding to the second layer signal to generate the values corresponding to the bits transmitted through the second layer.

In this case, the joint constellation demapper 2120 may utilize the LLR values for the first layer signal output from the LLR coupler 2117 at the time of the full-searching as a priori LLR value to thereby search for the constellation points corresponding to the first layer signal and the second layer signal. As such, in a joint detection process in which the constellation points corresponding to the first layer signal and the second layer signal are searched through the full-search to calculate the LLR values corresponding to the constellation points, the joint constellation demapper 2120 may utilize the LLR values for the first layer signal as a priori probability value.

In addition, the joint constellation demapper 2120 may output the values corresponding to the bits transmitted through the second layer to the data selector 2113.

The data selector 2113 may receive the signals output from the constellation demapper 2112 and the joint constellation demapper 2120, and may select one of the signals to be output.

Specifically, in the case in which the second layer signal is to be decoded, the data selector 2113 may output the signal received from the joint constellation demapper 2120 to the bit deinterleaver 2114.

The bit deinterleaver 2114 may deinterleave the signal output from the data selector 2113.

Specifically, in the case in which the second layer signal is to be decoded, the bit deinterleaver 2114 may inversely perform the operation performed by the second bit interleaver 122 of the transmitting apparatus 100, to thereby deinterleave the value corresponding to the bits and to output the deinterleaved values to the LDPC decoder 2115.

The LDPC decoder 2115 may restore information word bits transmitted through the second layer using the values output from the bit deinterleaver 2114.

Specifically, in the case in which the second layer signal is decoded, the LDPC decoder 2115 may perform LDPC decoding using the values output from the bit deinterleaver 2114 using a method corresponding to the LDPC encoding performed by the LDPC encoder (not shown) of the second encoder 121 of the transmitting apparatus 100. That is, the LDPC decoder 2115 may perform the LDPC decoding using the values output from the bit deinterleaver 2114 based on the parity check matrix used when the LDPC encoder (not shown) of the second encoder 121 performs the LDPC encoding, to thereby restore LDPC information word bits and LDPC parity bits from the second layer signal.

In addition, in the case in which the second layer signal is decoded, the BCH decoder 2116 may perform BCH decoding on the LDPC information word bits decoded by the LDPC decoder 2115 using a method corresponding to the BCH encoding performed by the BCH encoder (not shown) of the second encoder 121 of the transmitting apparatus 100, to thereby restore the information word bits transmitted through the second layer.

Through the above-mentioned operations, the receiving apparatus 1000 may receive the information word bits transmitted through the second layer signal.

Figure 22:
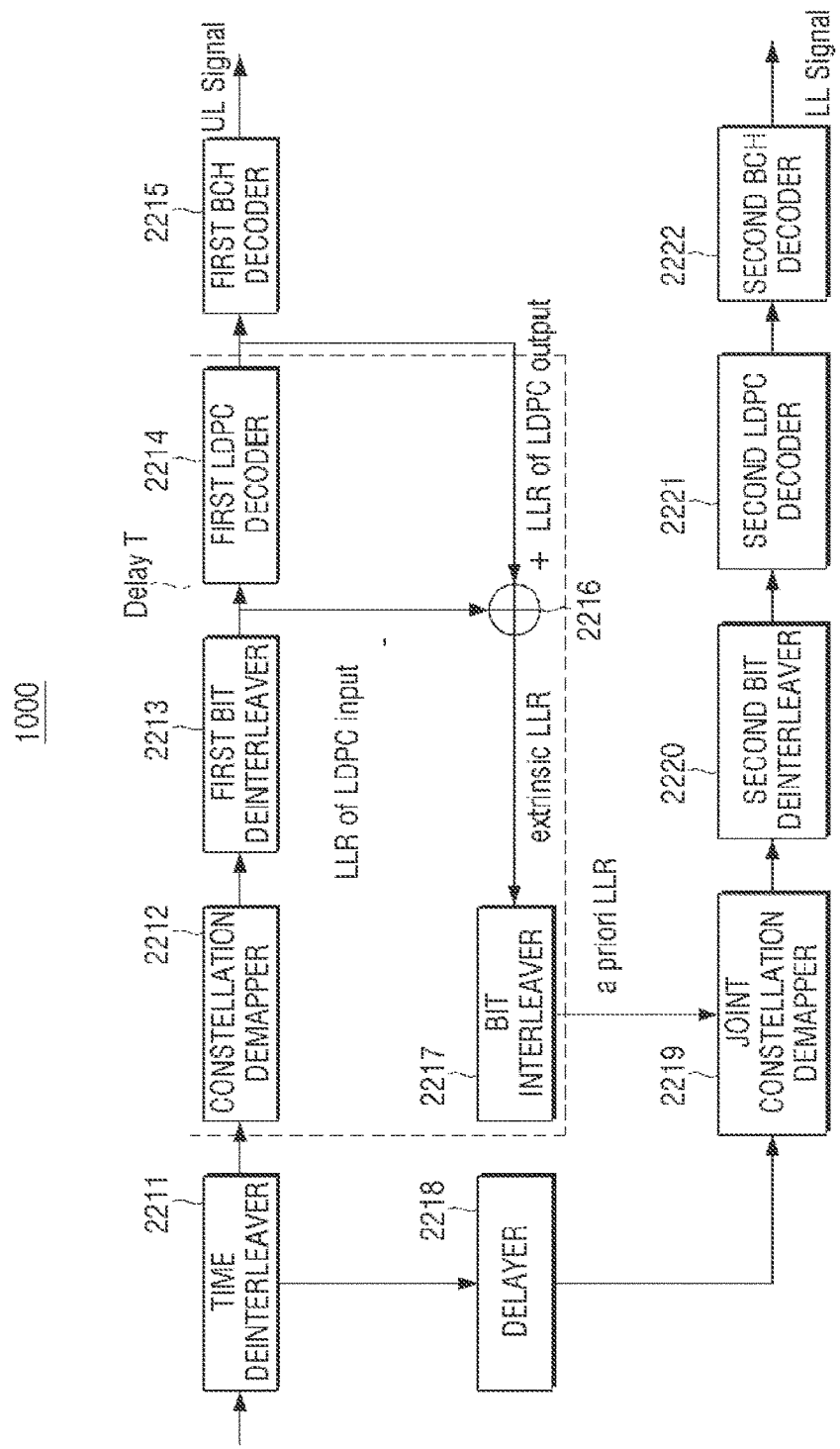

FIG. 22 is a block diagram illustrating a detailed configuration of a receiving apparatus according to an exemplary embodiment.

Referring to FIG. 22, the receiving apparatus 1000 may include a time deinterleaver 2211, a constellation demapper 2212, a first bit deinterleaver 2213, a first LDPC decoder 2214, a first BCH decoder 2215, an LLR coupler 2216, a bit interleaver 2217, a delayer 2218, a joint constellation demapper 2219, a second bit deinterleaver 2220, a second LDPC decoder 2221, and a second BCH decoder 2222.

The time deinterleaver 2211 deinterleaves cells demapped from a symbol of an OFDM frame.

Specifically, the time deinterleaver 2211, which is a configuration corresponding to the time interleaver 160 of the transmitting apparatus 100, may inversely perform the operation performed by the time interleaver 160. That is, the time deinterleaver 2211 may deinterleave the cells demapped from sub-carriers of the symbol, and may output the deinterleaved cells to the constellation demapper 2212 and the delayer 2218.

The constellation demapper 2212 may demodulate the signal output from the time deinterleaver 2211, to thereby generate values corresponding to the bits transmitted through the first layer.

Specifically, the constellation demapper 2212 may demodulate the signal output from the time deinterleaver 2111 based on the modulation scheme performed by the first constellation mapper 113 of the transmitting apparatus 100 to generate the values corresponding to the bits transmitted through the first layer, and may output the values to the first bit deinterleaver 2213.

The first bit deinterleaver 2213 may deinterleave the signal output from the constellation demapper 2212.

Specifically, the first bit deinterleaver 2213 may inversely perform the operation performed by the first bit interleaver 112 of the transmitting apparatus 100, to thereby deinterleave the value corresponding to the bits and to output the first LDPC decoder 2214.

The first LDPC decoder 2214 may restore information word bits transmitted through the first layer using the values output from the first bit deinterleaver 2213.

Specifically, the first LDPC decoder 2214 may perform LDPC decoding using the values output from the first bit deinterleaver 2213 using a method corresponding to the LDPC encoding performed by the LDPC encoder (not shown) of the first encoder 111 of the transmitting apparatus 100. That is, the first LDPC decoder 2214 may perform the LDPC decoding using the values output from the first bit deinterleaver 2213 based on the parity check matrix used when the LDPC encoder (not shown) of the first encoder 111 performs the LDPC encoding, to thereby restore LDPC information word bits and LDPC parity bits from the first layer signal.

In addition, the first BCH decoder 2215 may perform BCH decoding on the LDPC information word bits decoded by the first LDPC decoder (not shown) using a method corresponding to the BCH encoding performed by the BCH encoder (not shown) of the first encoder 111 of the transmitting apparatus 100, to thereby restore the information word bits transmitted through the first layer.

Through the above-mentioned operations, the receiving apparatus 1000 may receive the information word bits transmitted through the first layer signal.

The LLR coupler 2216 may sum LLR values, and may output the summed LLR values to the bit interleaver 2217.

Specifically, the first bit deinterleaver 2213 may deinterleave the values corresponding to the bits transmitted through the first layer, that is, the LLR values to output the deinterleaved values to the LLR coupler 2216. In addition, the LDPC decoder 2214 may update the LLR values received from the first bit deinterleaver 2213 using a message passing operation, and may decide the bit value as 0 or 1 based on the updated LLR values to decode the LDPC information word bits and the LDPC parity bits from the first layer signal, wherein the updated LLR values may be output to the LLR coupler 2216.

Accordingly, the LLR coupler 2216 may couple the LLR values received from the first bit deinterleaver 2213 and the LLR values received from the first LDPC decoder 2214, and may output the coupled LLR values to the bit interleaver 2217.

Specifically, the LLR coupler 2216 may subtract the LLR values received from the first bit deinterleaver 2213 from the LLR values received from the LDPC decoder 2214, and may then output the value (i.e., extrinsic LLR=LLR of LDPC decoder output−LLR of LDPC decoder input) to the bit interleaver 2217.

The bit interleaver 2217 may interleave the values output from the LLR coupler 2216.

Specifically, the bit interleaver 2217 may interleave the values output from the LLR coupler 2216 with the same system as that performed by the first bit interleaver 112 of the transmitting apparatus 100, and may output the interleaved values to the joint constellation mapper 2219.

The delayer 2218 may delay the signal output from the time deinterleaver 2211 to output the delayed signal.

Specifically, the delayer 2218 may delay the signal output from the time deinterleaver 2211 as much as a time (Delay T) obtained by summing all times taken to perform a signal processing at the constellation demapper 2212, the first bit deinterleaver 2213, the first LDPC decoder 2214, the LLR coupler 2216, and the bit interleaver 2217 to output the delayed signal to the joint constellation demapper 2219.

The joint constellation demapper 2219 may demodulate the signal output from the delayer 2218, to thereby generate values corresponding to the bits transmitted through the second layer.

Specifically, the joint constellation demapper 2219 may perform the full-search for the signal output the delayer 2218 based on the modulation scheme performed by the first constellation mapper 113 and the second constellation mapper 123 of the transmitting apparatus 100 to search for the constellation points corresponding to the first layer signal and the second layer signal, and may demodulate the constellation points corresponding to the second layer signal to generate the values corresponding to the bits transmitted through the second layer.

In this case, the joint constellation demapper 2219 may utilize the LLR values for the first layer signal output from the LLR coupler 2216 at the time of the full-searching as a priori LLR value to thereby search for the constellation points corresponding to the first layer signal and the second layer signal. As such, in a joint detection process in which the constellation points corresponding to the first layer signal and the second layer signal are searched through the full-search to calculate the LLR values corresponding to the constellation points, the joint constellation demapper 2219 may utilize the LLR values for the first layer signal as a priori probability value.

In addition, the joint constellation demapper 2219 may output the values corresponding to the bits transmitted through the second layer to the second bit deinterleaver 2220.

The second bit deinterleaver 2220 may deinterleave the signal output from the joint constellation demapper 2219.

Specifically, the second bit deinterleaver 2220 may inversely perform the operation performed by the second bit interleaver 122 of the transmitting apparatus 100, to thereby deinterleave the value corresponding to the bits and to output the second LDPC decoder 2221.

The second LDPC decoder 2221 may the information word bits transmitted through the second layer using the values output from the second bit deinterleaver 2220.

Specifically, the second LDPC decoder 2221 may perform LDPC decoding using the values output from the second bit deinterleaver 2213 using a method corresponding to the LDPC encoding performed by the LDPC encoder (not shown) of the second encoder 121 of the transmitting apparatus 100. That is, the second LDPC decoder 2221) may perform the LDPC decoding using the values output from the second bit deinterleaver 2220 based on the parity check matrix used when the LDPC encoder (not shown) of the second encoder 121 performs the LDPC encoding, to thereby restore LDPC information word bits and LDPC parity bits from the second layer signal.

In addition, the second BCH decoder 2222 may perform BCH decoding on the LDPC information word bits decoded by the second LDPC decoder (not shown) using a method corresponding to the BCH encoding performed by the BCH encoder (not shown) of the second encoder 121 of the transmitting apparatus 100, to thereby restore the information word bits transmitted through the second layer.

Through the above-mentioned operations, the receiving apparatus 1000 may receive the information word bits transmitted through the second layer signal.

Meanwhile, although the exemplary embodiments described above describe the case in which the BCH decoding is performed, this assumes that the transmitting apparatus 100 uses a BCH code as an outer code. Therefore, in the case in which the transmitting apparatus 100 uses a CRC code as the outer code, the receiving apparatus 1000 may also restore the information word bits using a CRC decoder instead of the BCH decoder.

Meanwhile, in the case in which the respective layer signals are processed by one FEC block, since the time taken to restore the second layer signal may be increased as compared to when the respective layer signals are processed in parallel by two FEC blocks, the number of iteration times may be adjusted at the time of the LDPC decoding by considering the increased time in the case in which the respective layer signals are processed by one FEC block.

Specifically, when the signals transmitted through the respective layers are decoded, it is assumed that the number of iteration times required to satisfy performance required by the system is N times. In the case in which N iterations are performed whenever the respective layer signals are decoded by one FEC block, a problem that a processing time is delayed may occur. Accordingly, according to the present disclosure, when the first layer signal is decoded, $N_1$ iterations may be performed, and when the second layer signal is decoded, $N_2$ iterations may be performed (here, $N_1+N_2=N$, $N_1<N_2$).

The reason of adjusting the number of iteration times is because it is possible to restore the bits transmitted through the first layer signal at low error occurrence possibility even though the iteration is performed at the relatively small number of times when the first layer signal is decoded, since the second layer signal in the LDM signal may be operated at a sufficiently high signal to noise ratio (SNR) as compared to the first layer signal, and the LDPC code applied to the first layer may be operated even at a low SNR.

Figure 23:
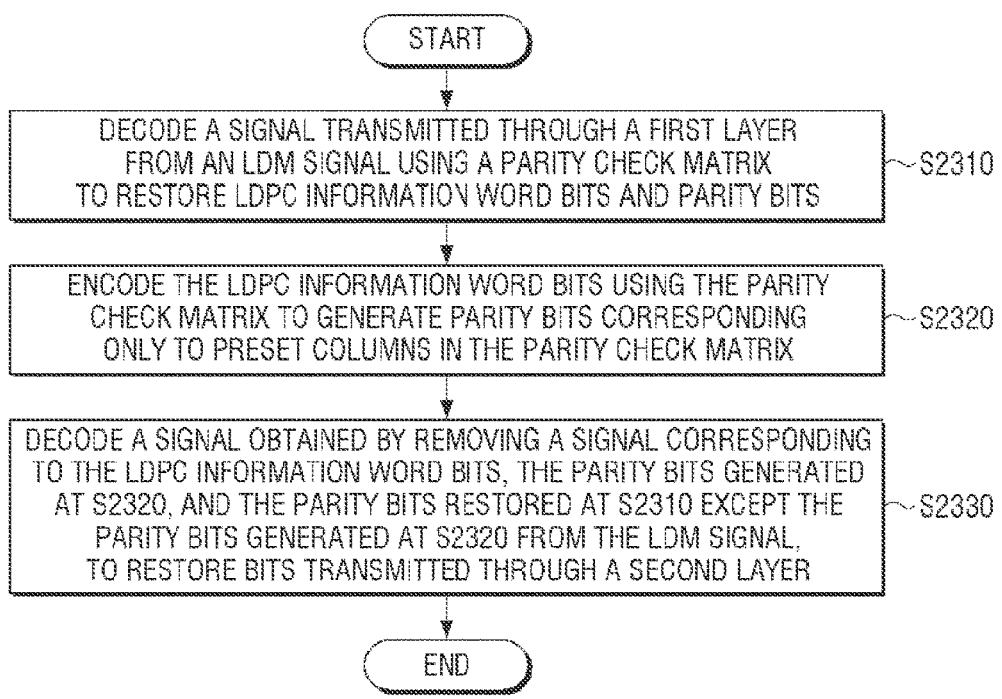
FIG. 23 is a flowchart illustrating a decoding method of a receiving apparatus according to an exemplary embodiment.

FIG. 23 is a flowchart illustrating a decoding method of a receiving apparatus according to an exemplary embodiment.

First, LDPC information word bits and parity bits are restored by decoding a signal transmitted through a first layer from an LDM signal using a parity check matrix (S2310).

Next, the LDPC information word bits are encoded using the parity check matrix to generate parity bits corresponding only to preset columns in the parity check matrix (S2320).

Here, the preset columns may be columns having a degree of 1 in the parity check matrix.

Specifically, the parity check matrix may include a first parity check matrix including a first information word partial matrix and a first parity partial matrix, which is a dual diagonal matrix, and a second parity check matrix including a second information word partial matrix and a second parity partial matrix which is a unit matrix, and in S2320, the parity bits corresponding only to the columns having the degree of 1 in the parity check matrix may be generated.

Meanwhile, a signal obtained by removing a signal corresponding to the LDPC information word bits, the parity bits generated at S2320, and the parity bits restored at S2310 except the parity bits generated at S2320 from the LDM signal are decoded to restore bits transmitted through a second layer (S2330).

Meanwhile, in S2310, the LDPC information word bits and the parity bits may be restored by decoding the signal transmitted through the first layer using a first LDPC decoder, and the LDPC information word bits may be decoded using a first BCH decoder to restore information word bits transmitted through the first layer.

In this case, in S2320, the LDPC information word bits are encoded using the LDPC encoder to generate the parity bits corresponding only to the preset columns in the parity check matrix.

In this case, in S2320, the information word bits are encoded using a BCH encoder to generate BCH parity bits, and the LDPC encoder may encode a BCH codeword including the information word bits and the BCH parity bits to generate the parity bits corresponding only to the preset columns in the parity check matrix.

Meanwhile, in S2330, the signal obtained by the removing is decoded to restore LDPC information word bits and parity bits corresponding to a signal transmitted through the second layer may be decoded using a first LDPC decoder, and the LDPC information word bits corresponding to the signal transmitted through the second layer may be decoded using a first BCH decoder to restore information word bits transmitted through the second layer.

Alternatively, in S2330, the signal obtained by the removing is decoded to restore the LDPC information word bits and the parity bits corresponding to the signal transmitted through the second layer may be decoded using a second LDPC decoder, and the LDPC information word bits corresponding to the signal transmitted through the second layer may be decoded using a second BCH decoder to restore the information word bits transmitted through the second layer.

Meanwhile, a non-transitory computer readable medium having a program stored therein may be provided, wherein the program sequentially performs the decoding method according to the present disclosure.

The non-transitory computer readable medium does not mean a medium storing data for a short period such as a register, a cache, a memory, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

At least one of the components, elements, modules or units represented by a block as illustrated in FIGS. 1, 4, 6 and 9-22 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

Hereinabove, although the exemplary embodiments have been shown and described, it should be understood that the inventive concept is not limited to the disclosed embodiments and may be variously changed without departing from the spirit and the scope of the inventive concept. Therefore, the exemplary embodiments described above should be construed as including all the changes, equivalents, and substitutions included in the spirit and scope of the inventive concept.

What is claimed is:

1. A receiving apparatus for receiving and decoding a layered division multiplexing (LDM) signal which is generated based on a first layer and a second layer, the receiving apparatus comprising:
    a first decoder configured to decode the LDM signal based on a parity check matrix comprising a plurality of columns to generate first information bits and first parity bits transmitted through the first layer, each of the first parity bits corresponding to each of the plurality of columns;
    an encoder configured to encode the first information bits based on the parity check matrix to generate second parity bits corresponding to predetermined columns among the plurality of columns; and
    a second decoder configured to decode a first signal to generate second information bits transmitted through the second layer,
    wherein the first signal is obtained by removing a second signal from the LDM signal, and
    wherein the second signal is generated based on the first information bits, one or more parity bits of the first parity bits except parity bits corresponding to the predetermined columns, and the second parity bits.

2. The receiving apparatus as claimed in claim 1, wherein the predetermined columns are columns having a degree of 1 in the parity check matrix.

3. The receiving apparatus as claimed in claim 2, wherein the parity check matrix comprises a first parity check matrix comprising a first information sub matrix and a first parity sub matrix which is a dual diagonal matrix, and a second parity check matrix comprising a second information sub matrix and a second parity sub matrix which is an identity matrix, and
    wherein the encoder is configured to generate the second parity bits corresponding to the predetermined columns having the degree of 1 in the parity check matrix.

4. The receiving apparatus as claimed in claim 1, wherein the first decoder comprises a first low density parity check (LDPC) decoder and a first Bose, Chaudhuri, Hocquenghem (BCH) decoder,
    wherein the first LDPC decoder is configured to decode the LDM signal to generate first low density parity check (LDPC) information bits transmitted through the first layer, and
    wherein the first BCH decoder is configured to decode the first LDPC information bits to generate bits transmitted through the first layer.

5. The receiving apparatus as claimed in claim 4, wherein the encoder comprises an LDPC encoder, and
    wherein the LDPC encoder is configured to encode the first LDPC information bits to generate the second parity bits.

6. The receiving apparatus as claimed in claim 5, wherein the encoder further comprises an BCH encoder, and
    wherein the BCH encoder is configured to encode the first LDPC information bits to generate BCH parity bits, and
    wherein the LDPC encoder is configured to encode the first LDPC information bits and the BCH parity bits to generate the second parity bits.

7. The receiving apparatus as claimed in claim 4, wherein the second decoder comprises a second LDPC decoder and a second BCH decoder,
    wherein the second LDPC decoder is configured to decode the obtained signal to generate second LDPC information bits transmitted through the second layer, and
    wherein the second BCH decoder is configured to decode the second LDPC information bits to generate bits transmitted through the second layer.

8. A method of a receiving apparatus for receiving and decoding a layered division multiplexing (LDM) signal which is generated based on a first layer and a second layer, the method comprising:
    decoding the LDM signal based on a parity check matrix comprising a plurality of columns to generate first information bits and first parity bits transmitted through the first layer, each of the first parity bits corresponding to each of the plurality of columns;
    encoding the first information bits based on the parity check matrix to generate second parity bits corresponding to predetermined columns among the plurality of columns; and
    decoding a first signal to generate second information bits transmitted through the second layer,
    wherein the first signal is obtained by removing a second signal from the LDM signal, and
    wherein the second signal is generated based on the first information bits, one or more parity bits of the first parity bits except parity bits corresponding to the predetermined columns, and the second parity bits.

9. The method as claimed in claim 8, wherein the predetermined columns are columns having a degree of 1 in the parity check matrix.

10. The method as claimed in claim 9, wherein the parity check matrix comprises a first parity check matrix comprising a first information sub matrix and a first parity sub matrix which is a dual diagonal matrix, and a second parity check matrix comprising a second information sub matrix and a second parity partial matrix which is an identity matrix, and
    wherein the predetermined preset columns have the degree of 1 in the parity check matrix.

11. The method as claimed in claim 8, wherein the decoding the LDM signal decodes the LDM signal to generate first low density parity check (LDPC) information bits transmitted through the first layer and decodes the first LDPC information bits to generate bits transmitted through the first layer.

12. The method as claimed in claim 11, wherein the encoding encodes the first LDPC information bits to generate the second parity bits.

13. The method as claimed in claim 12, wherein the encoding encode the bits to generate BCH parity bits and encodes the bits and the BCH parity bits to generate the second parity bits.

14. The method as claimed in claim 11, wherein the decoding the obtained signal decodes the obtained signal to generate second LDPC information bits transmitted through the second layer and decodes the second LDPC information bits to generate bits transmitted through the second layer.

* * * * *